US012251698B2

(12) United States Patent
Wei et al.

(10) Patent No.: US 12,251,698 B2
(45) Date of Patent: Mar. 18, 2025

(54) MICRO-FLUIDIC CHIP

(71) Applicants: Beijing BOE Sensor Technology Co., Ltd., Beijing (CN); BOE TECHNOLOGY GROUP CO., LTD., Beijing (CN)

(72) Inventors: Qiuxu Wei, Beijing (CN); Wenliang Yao, Beijing (CN); Yingying Zhao, Beijing (CN); Le Gu, Beijing (CN); Bolin Fan, Beijing (CN); Yongjia Gao, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 241 days.

(21) Appl. No.: 17/489,920

(22) Filed: Sep. 30, 2021

(65) Prior Publication Data

US 2022/0226816 A1 Jul. 21, 2022

(30) Foreign Application Priority Data

Jan. 21, 2021 (CN) ........................ 202110081632.5

(51) Int. Cl.
*B01L 3/00* (2006.01)

(52) U.S. Cl.
CPC ... *B01L 3/502715* (2013.01); *B01L 2200/025* (2013.01); *B01L 2200/027* (2013.01);
(Continued)

(58) Field of Classification Search
CPC ......... B01L 3/502715; B01L 3/502792; B01L 3/5027; B01L 2200/025; B01L 2200/027;
(Continued)

(56) References Cited

U.S. PATENT DOCUMENTS

2009/0236226 A1* 9/2009 Yuen ........................ B01L 9/527 204/600
2015/0306599 A1* 10/2015 Khandros ............... B03C 5/005 204/547
(Continued)

FOREIGN PATENT DOCUMENTS

CN 102036750 A 4/2011
CN 103143406 A 6/2013
(Continued)

OTHER PUBLICATIONS

China Patent Office, First Office Action dated Mar. 31, 2022 for application No. CN202110081632.5.

*Primary Examiner* — Samuel P Siefke
*Assistant Examiner* — Alea N. Martin
(74) *Attorney, Agent, or Firm* — Houtteman Law LLC

(57) ABSTRACT

The disclosure provides a micro-fluidic chip, and belongs to the field of chip technology. The microfluidic chip provided in the present disclosure includes a plurality of microfluidic units, each microfluidic unit includes an operation region and a transition region located on at least one side of the operation region, the transition regions at adjacent side of two adjacent microfluidic units are disposed opposite to each other. Each microfluidic unit includes: a first substrate; a first electrode layer disposed on the first substrate, the first electrode layer including a plurality of first sub-electrodes located in the operation region and at least one second sub-electrode located in the transition region, and the at least one second sub-electrode configured to drive a droplet to move from one of the plurality of microfluidic units to an adjacent microfluidic unit.

18 Claims, 10 Drawing Sheets

(52) U.S. Cl.
CPC ... *B01L 2200/028* (2013.01); *B01L 2200/147* (2013.01); *B01L 2300/0609* (2013.01); *B01L 2300/0663* (2013.01); *B01L 2300/087* (2013.01); *B01L 2300/161* (2013.01); *B01L 2300/1805* (2013.01); *B01L 2400/0424* (2013.01)

(58) Field of Classification Search
CPC ......... B01L 2200/028; B01L 2200/147; B01L 2200/20; B01L 2300/0609; B01L 2300/0663; B01L 2300/087; B01L 2300/161; B01L 2300/1805; B01L 2300/0645; B01L 2400/0424
See application file for complete search history.

(56) References Cited

U.S. PATENT DOCUMENTS

| | | | | |
|---|---|---|---|---|
| 2017/0315090 | A1* | 11/2017 | Wheeler | G01N 27/403 |
| 2019/0351418 | A1* | 11/2019 | Lv | G01N 15/1023 |
| 2020/0078791 | A1* | 3/2020 | Geng | B01L 3/502715 |
| 2020/0108387 | A1* | 4/2020 | Dong | G01N 21/645 |
| 2020/0129979 | A1* | 4/2020 | Shkolnikov | B01L 3/502784 |
| 2021/0379594 | A1* | 12/2021 | Gong | B01L 3/502792 |

FOREIGN PATENT DOCUMENTS

| | | | |
|---|---|---|---|
| CN | 107020165 | A | 8/2017 |
| CN | 108393105 | A | 8/2018 |
| CN | 109261233 | A | 1/2019 |
| CN | 110639627 | A | 1/2020 |
| CN | 211562995 | U | 9/2020 |

* cited by examiner

MICRO-FLUIDIC CHIP

CROSS-REFERENCE TO RELATED APPLICATION

This application claims priority to Chinese Patent Application No. 202110081632.5, filed on Jan. 21, 2021, the disclosure of which is incorporated by reference herein in its entirety.

TECHNICAL FIELD

The disclosure belongs to the field of microfluidic technology, and more particularly, to a microfluidic chip.

BACKGROUND

Microfluidics technology is an emerging interdisciplinary subject related to chemistry, fluid physics, microelectronics, new materials, biology and biomedical engineering, and can realize precise control and manipulation of micro droplets. Devices employing microfluidic technology are often referred to as microfluidic chips, and microfluidic chips generally have multiple operation regions, each having different functions (e.g., functions of driving liquid flow, generating sample droplets, mixing liquid, heating liquid, etc.) to realize cultivation, movement, detection, analysis, etc. of the sample liquid. When different reactions are carried out, the microfluidic chip is required to carry out different operations on the sample liquid, so that each reaction requires revising or designing different operation regions and combination modes of the operation regions, and various different reactions cannot be flexibly adapted. In addition, it is difficult to realize local repair and damage repair for the micro-fluidic chip as a whole, so waste is easily caused.

SUMMARY

The present disclosure provides a microfluidic chip including a plurality of microfluidic units, each microfluidic unit has an operation region, and different microfluidic units can be freely combined to form a microfluidic chip, which can adapt to various biological detections, and can be repaired or replaced locally, thereby avoiding waste.

The present disclosure provides a microfluidic chip including a plurality of microfluidic units, each of the plurality of microfluidic units including an operation region and a transition region located at least one side of the operation region, the transition regions located at adjacent sides of two adjacent microfluidic units of the plurality of microfluidic units being disposed opposite to each other. Each of the plurality of microfluidic units includes: a first substrate; a first electrode layer disposed on the first substrate, the first electrode layer including a plurality of first sub-electrodes located in the operation region and at least one second sub-electrode located in the transition region, and the at least one second sub-electrode being configured to drive a droplet to move from one of the plurality of microfluidic units to an adjacent microfluidic unit.

In some embodiments, each of the plurality of microfluidic units further includes a first dielectric layer disposed on the first electrode layer, and the first dielectric layer is made of a material having hydrophobicity.

In some embodiments, each of the plurality of microfluidic units further includes: a first dielectric layer disposed on the first electrode layer; and a first hydrophobic layer disposed on the first dielectric layer, and the first dielectric layer is made of a material having no hydrophobicity.

In some embodiments, an area of an orthographic projection of the at least one second sub-electrode on the first substrate is smaller than an area of an orthographic projection of each of the plurality of first sub-electrodes on the first substrate.

In some embodiments, a ratio of the area of the orthographic projection of the at least one second sub-electrode on the first substrate to the area of the orthographic projection of each of the plurality of first sub-electrodes on the first substrate is 1:9 to 1:2.

In some embodiments, each of the plurality of microfluidic units further includes: a second substrate disposed opposite to the first substrate; and a reference electrode disposed on a side of the second substrate close to the first substrate, an orthographic projection of the reference electrode on the first substrate covering an orthographic projection of the plurality of first sub-electrodes on the first substrate and at least partially overlapping an orthographic projection of the at least one second sub-electrode on the first substrate.

In some embodiments, the reference electrode includes a plurality of sub-reference electrodes in one-to-one correspondence with the plurality of first sub-electrodes and the at least one second sub-electrode.

In some embodiments, an orthographic projection of the second substrate on the first substrate partially overlaps an orthographic projection of the at least one second sub-electrode on the first substrate in the same microfluidic unit.

In some embodiments, an orthographic projection of the second substrate on the first substrate partially overlaps the orthographic projection of the at least one second sub-electrode on the first substrate in the same microfluidic unit.

In some embodiments, the orthographic projection of the second substrate on the first substrate overlaps half of the orthographic projection of the at least one second sub-electrode on the first substrate in the same microfluidic unit.

In some embodiments, each of the plurality of microfluidic units further includes a bonding layer disposed between the first substrate and the second substrate and surrounding an edge region of each microfluidic unit; the bonding layer has a first opening at the transition region, and the first openings of two adjacent microfluidic units are arranged opposite to each other.

In some embodiments, the microfluidic chip further includes a fixation assembly for fixing the plurality of microfluidic units to form the microfluidic chip.

In some embodiments, the fixation assembly includes an outer frame, a plurality of stoppers and a plurality of springs arranged within the outer frame, the outer frame is configured to define the plurality of microfluidic units therein, and has a rectangular shape, one ends of the plurality of springs are connected to at least two inner sidewalls of the outer frame, and the other ends of the plurality of springs are connected to the plurality of stoppers, and the plurality of stoppers are in contact with some of the plurality of microfluidic units at an outer edge, respectively, others of the microfluidic units at the outer edge are in contact with other inner sidewalls of the outer frame other than the at least two inner sidewalls, and the plurality of springs are in a compressed state such that restoring forces of the plurality of springs are applied to the plurality of microfluidic units.

In some embodiments, the microfluidic chip further includes a flat support layer, the plurality of microfluidic units being disposed on the flat support layer.

In some embodiments, the microfluidic chip further includes an adhesive structure disposed on the first substrate in the transition regions of two adjacent microfluidic units to connect the two adjacent microfluidic units to each other.

In some embodiments, at least one microfluidic unit in the microfluidic chip further includes a temperature measuring circuit coupled to at least two adjacent first sub-electrodes of the at least one microfluidic unit to detect a temperature of the droplet flowing through the two adjacent first sub-electrodes.

In some embodiments, the temperature measuring circuit includes an operational amplifier, a signal processing circuit and a feedback capacitor; the operational amplifier has a first input port, a second input port and an output port, and the first input port is coupled to the two adjacent first sub-electrodes that are coupled to the temperature measuring circuit; the feedback capacitor is coupled between the first input port and the output port; the signal processing circuit is coupled to the output port.

In some embodiments, the at least one microfluidic unit coupled to the thermometric circuit further includes two feedback electrodes disposed on the first substrate of the at least one microfluidic unit and on one side of the first electrode layer in a direction perpendicular to an arrangement direction of the plurality of first sub-electrodes so as to correspond to the two adjacent first sub-electrodes; the two feedback electrodes are two electrode plates of the feedback capacitor, and the two feedback electrodes are respectively coupled to the first input port and the output port.

In some embodiments, the at least one microfluidic unit coupled to the temperature measuring circuit further includes a dummy electrode disposed between the two feedback electrodes and the two adjacent first sub-electrodes and configured to isolate a signal between the two feedback electrodes and the two adjacent first sub-electrodes.

In some embodiments, the at least one microfluidic unit further includes a temperature adjusting circuit and a control circuit, the temperature measuring circuit and the temperature adjusting circuit are both coupled to the control circuit; the control circuit is configured to control the temperature adjusting circuit to adjust the temperature of the droplet according to the temperature measured by the temperature measuring circuit.

In some embodiments, the temperature adjusting circuit includes a thermoelectric temperature adjusting sheet disposed on a side of the first substrate of the at least one microfluidic unit coupled to the temperature measuring circuit facing away from the plurality of first sub-electrodes; and an orthographic projection of the thermoelectric temperature adjusting sheet on the first substrate covers an orthographic projection of each of the plurality of first sub-electrodes of the at least one micro-fluidic unit coupled to the temperature measuring circuit on the first substrate.

DETAILED DESCRIPTION

Figure 1:
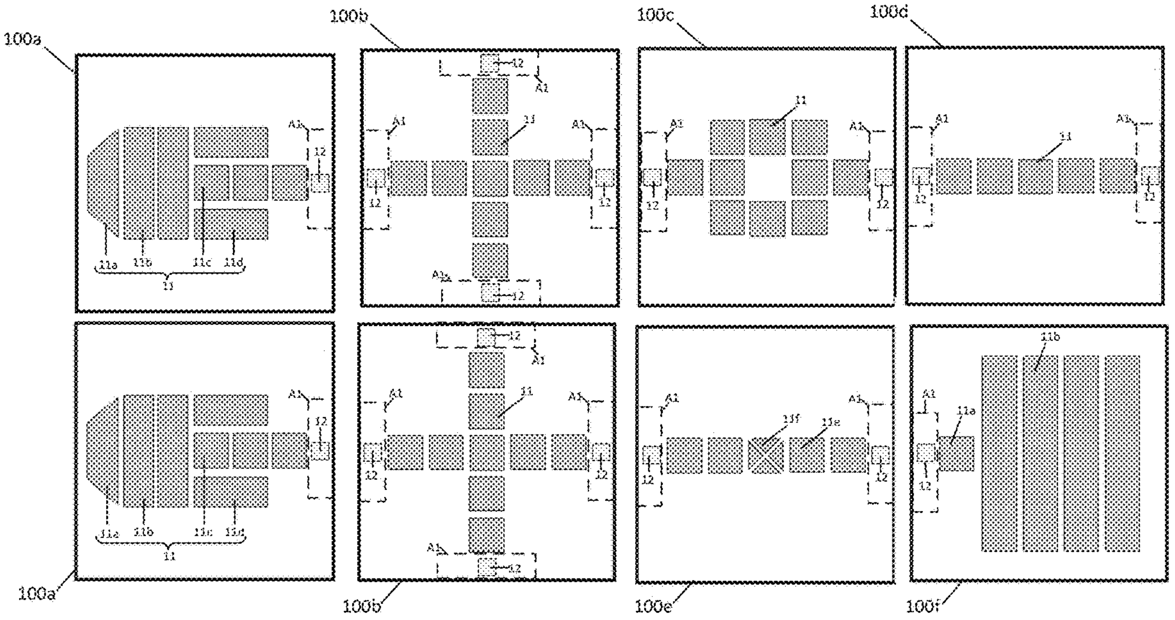
FIG. 1 is a top view of a microfluidic chip according to an embodiment of the present disclosure.

The technical solutions of the present disclosure will be better understood by those skilled in the art by the following detailed description with reference to the accompanying drawings.

The shapes and sizes of the components in the drawings do not reflect true scale, but are merely for the purpose of facilitating understanding of the contents of the embodiments of the present disclosure.

The technical or scientific terms used herein should have the same meaning as commonly understood by one of ordinary skill in the art to which this disclosure belongs, unless defined otherwise. The terms "first," "second," and the like used in this disclosure are not intended to indicate any order, quantity, or importance, but rather is used to distinguish one element from another. Likewise, the terms "a," "an," or "the" and the like do not denote a limitation of quantity, but rather denote the presence of at least one. The word "include" or "comprise", and the like, means that the element or item preceding the word includes the element or item listed after the word and its equivalent, but does not exclude other elements or items. The terms "connected" or "coupled" and the like are not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

Figure 2:
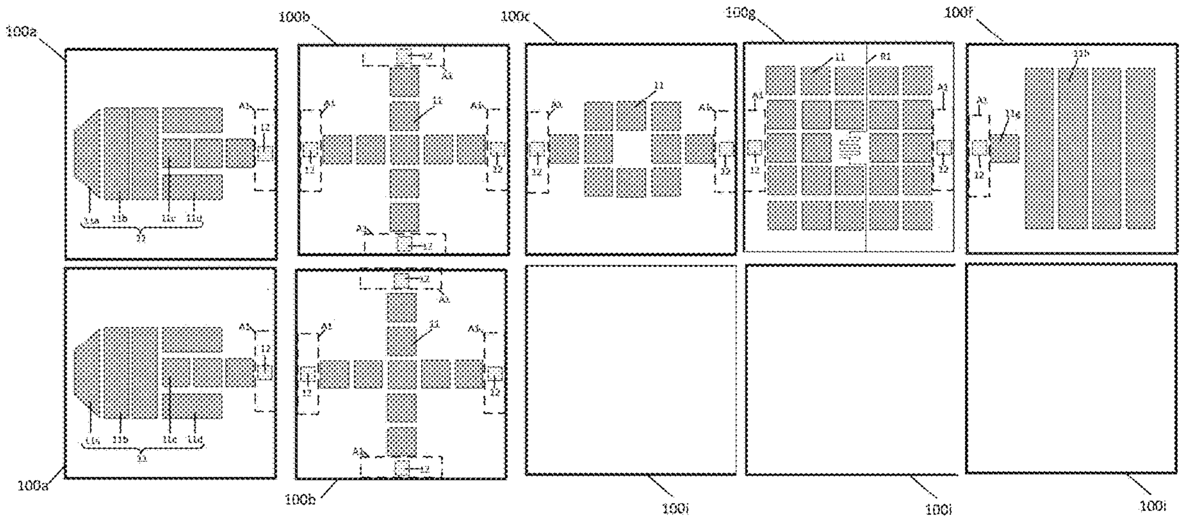
FIG. 2 is a top view of a microfluidic chip according to another embodiment of the present disclosure.

In a first aspect, as shown in FIGS. 1 and 2, the present embodiment provides a microfluidic chip, which includes a plurality of microfluidic units 100*a* to 100*g*, and the microfluidic units can be combined to form the microfluidic chip. Each microfluidic unit may include an operation region and a transition region A1 located on at least one side of the operation region, and the operation region is a region of the microfluidic unit other than the transition region A1. The transition region A1 of one microfluidic unit is a region of the microfluidic unit that is close to another adjacent microfluidic unit, and the transition regions of any two adjacent microfluidic units are disposed immediately adjacent to and opposite to each other. A droplet moves from the transition region A1 of one microfluidic unit to the transition region A1 of another microfluidic unit, thereby enabling the transit of the droplet between different microfluidic units. Different microfluidic units may have different functions. For example, the microfluidic unit 100*a* has a function of generating the droplet, the microfluidic unit 100*b* has a function of controlling the turning of the droplet, the microfluidic unit 100*c* has a function of mixing different kinds of droplets, the microfluidic unit 100*d* has a function of moving the droplet, the microfluidic unit 100*e* has a function of splitting the droplet into sub-droplets, the microfluidic unit 100*f* has a function of sampling the droplet, and the microfluidic unit 100*g* has a function of regulating the temperature of the droplet. The microfluidic units with different functions can be combined according to the flow sequence of biological detection required, thereby forming different types of microfluidic chips to be adaptable to various biological detections.

Figure 3:
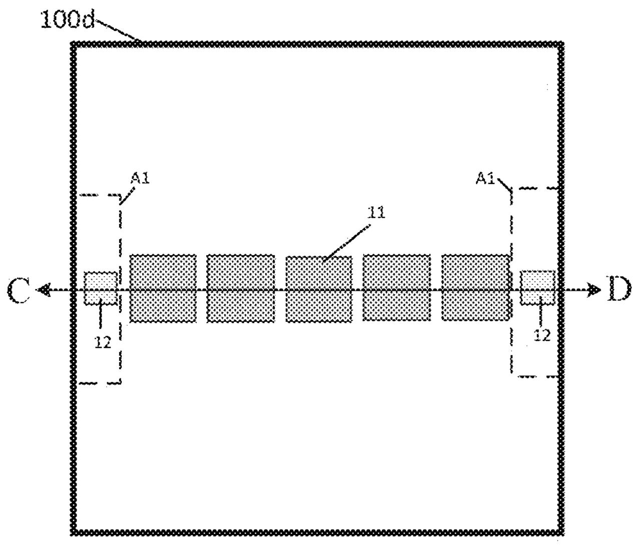
FIG. 3 is a top view of a microfluidic unit of the microfluidic chip according to an embodiment of the present disclosure.
Figure 4:
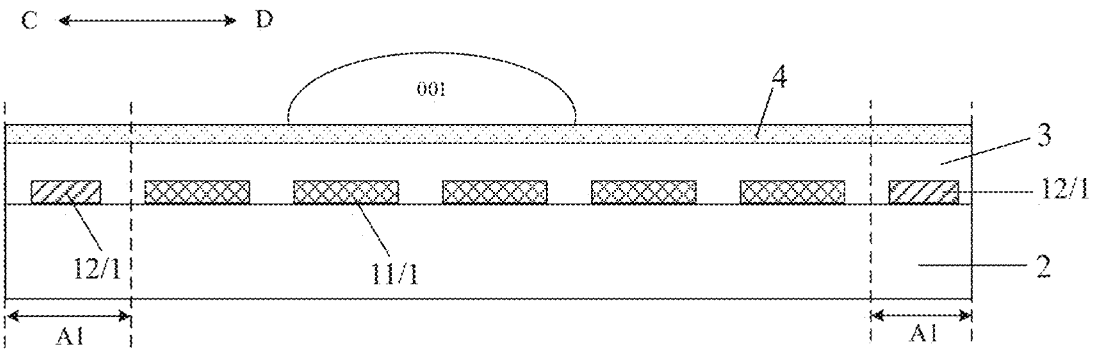
FIG. 4 is a sectional view taken along a direction C-D in FIG. 3.

Specifically, as shown in FIGS. 3 and 4, it is illustrated an example of the microfluidic unit 100*d* having a function of moving a droplet, and the structures of the microfluidic units having other functions are similar to that of the microfluidic unit 100*d*. FIG. 3 is a top view of the microfluidic unit 100*d*, and FIG. 4 is a cross-sectional view of the microfluidic unit 100*d* taken along the direction C-D of FIG. 3, each microfluidic unit may include a first substrate 2 and a first electrode layer 1 disposed on the first substrate 2. The first electrode layer 1 includes a plurality of first sub-electrodes 11 located in the operation region and at least one second sub-electrode 12 located in the transition region A1. That is, an orthographic projection of the plurality of first sub-electrodes 11 of the first electrode layer 1 on the first substrate 2 is located within the operation region, and an orthographic projection of the at least one second sub-electrode 12 on the first substrate 2 is located within the transition region A1 of the microfluidic unit 100*d* having the function of moving a droplet. As shown in FIGS. 1 and 2, the first sub-electrode 11 located in the operation region is used for performing an operation of the corresponding function of the microfluidic unit, such as moving, splitting, turning, etc., on the droplet. The first sub-electrodes 11 in the operation region of each microfluidic unit have different arrangements according to the corresponding function of the microfluidic unit, as will be described in detail later. The second sub-electrode 12 located in the transition region A1 is used to manipulate the movement of the droplet from the microfluidic unit where the second sub-electrode 12 is located to another microfluidic unit adjacent to the microfluidic unit, so as to enable the droplet to move between the microfluidic units of the combined microfluidic chip.

The microfluidic chip provided by the embodiment of the disclosure is provided with a plurality of microfluidic units, each microfluidic unit has one operation region, and the plurality of microfluidic units can be freely combined according to a flow path required by biological detection to form the microfluidic chip, so that the microfluidic chip can adapt to various biological detections. In addition, when the microfluidic unit with a certain function is damaged, the microfluidic unit can be independently removed for local repair or replacement, thereby avoiding a case where the whole microfluidic chip needs to be discarded due to local damage, and avoiding waste. Furthermore, by providing the second sub-electrode in the transition region A1 of each microfluidic unit, it is possible to drive the droplet from one microfluidic unit to another microfluidic unit adjacent thereto.

In some embodiments, as shown in FIG. 4, the first substrate 2 may further include a first dielectric layer 3, and the first dielectric layer 3 is arranged on a side of the first electrode layer 1 facing away from the first substrate 2. In a case where the first dielectric layer 3 has good hydrophobicity, the droplet 001 is in direct contact with the first dielectric layer 3. When no voltage is applied to the first sub-electrode 11, the first dielectric layer 3 causes the droplet 001 to have a large surface tension due to its hydrophobic property, and a contact angle of the droplet 001 and the first dielectric layer 3 is an initial contact angle. When a voltage is applied to the first sub-electrode 11, charges accumulate at the first sub-electrode 11 to which the voltage is applied because of the first dielectric layer 3. In this case, the wetting characteristic between the first dielectric layer 3 and the droplet 001 attached to the surface of the first dielectric layer 3 may be changed (i.e., the contact angle between the droplet 001 and the first dielectric layer 3 is changed), so that the droplet 001 is deformed such that a difference in pressure occurs inside the droplet 001, thereby implementing the control of the droplet 001. The first dielectric layer 3 may be made of various materials, such as resin, polyimide, silicon nitride, silicon oxide, etc., which is not limited herein.

In some embodiments, as shown in FIG. 4, in a case where the first dielectric layer 3 is made of a material without hydrophobicity, the first hydrophobic layer 4 may be disposed on a side of the first dielectric layer 3 facing away from the first substrate 2, and the first hydrophobic layer 4 is in direct contact with the droplet 001, so that the droplet 001 has a large surface tension. A dielectric constant of the first hydrophobic layer 4 may be the same as or different from that of the first dielectric layer 3, and is not limited herein. The material of the first hydrophobic layer 4 may include various types of materials, for example, fluorine-containing polymers such as teflon, perfluoro resin (CYTOP), etc., and is not limited herein.

In some embodiments, the microfluidic chip provided by embodiments of the present disclosure can manipulate various types of droplets. For example, the droplet may be water ($H_2O$), blood, or the like. In addition, a fluid (e.g., silicone oil) with a lubricating effect may be added to a fluid layer where the droplet is located to reduce damping of the liquid during movement, and the added fluid may also be another fluid, which is not limited herein.

It should be noted that FIGS. 3 and 4 illustrate an example in which the microfluidic unit includes only a single substrate (e.g., the first substrate 2). In some embodiments, the microfluidic units may also have two opposing substrates. For example, refer to FIGS. 5*a* to 9, each microfluidic unit may further include a second substrate 5, the second substrate 5 is arranged opposite to the first substrate 2. One side of the second substrate 5 facing the first substrate 2 may also be provided with a reference electrode 6. An orthographic projection of the reference electrode 6 on the first substrate 2 may cover the orthographic projection of the plurality of first sub-electrodes 11 (e.g., 11*a* and 11*b*) on the first substrate 2, and the orthographic projection of the reference electrode 6 on the first substrate 2 at least partially overlaps with the orthographic projection of the second sub-electrode 12 on the first substrate 2. A reference voltage is applied to the reference electrode 6 to provide the first sub-electrode 11 and the second sub-electrode 12 with a reference voltage. In this case, there are large voltage differences between the first sub-electrode 11 and the reference electrode 6 and between the second sub-electrode 12 and the reference electrode 6, resulting in a large driving voltage to control the movement of the droplet 001.

In some embodiments, the reference electrode 6 may have various shapes. For example, the reference electrode 6 may be a plate electrode covering the plurality of first sub-electrodes 11 and the at least one second sub-electrode 12. For another example, the reference electrode 6 includes a plurality of sub-reference electrodes (e.g., a plurality of strip-shaped electrodes). In the operation region, one sub-reference electrode corresponds to one first sub-electrode 11, and the orthographic projection of each sub-reference electrode on the first substrate 2 covers the orthographic projection of the first sub-electrode 11 corresponding to the sub-reference electrode on the first substrate 2. In the transition region A1, one sub-reference electrode corresponds to one second sub-electrode 12, and the orthographic projection of each sub-reference electrode on the first substrate 2 covers the orthographic projection of the second sub-electrode 12 corresponding to the sub-reference electrode on the first substrate 2. In the microfluidic chip provided in the embodiments of the present disclosure, the microfluidic unit may include only the first substrate 2, or may include both the first substrate 2 and the second substrate 5, and for convenience of explanation, the following embodiments of the microfluidic unit are described as including the first substrate 2 and the second substrate 5, but are not limited to this application.

In some embodiments, referring to FIGS. 5 to 9, as with the arrangement of the first substrate 2, the second substrate 5 may further include a second dielectric layer 7, the second dielectric layer 7 is arranged on a side of the reference electrode 6 facing away from the second substrate 5. If the first dielectric layer 3 and the second dielectric layer 7 have good hydrophobicity, a lower portion of the droplet 001 directly contacts the first dielectric layer 3, and an upper portion of the droplet 001 directly contacts the second dielectric layer 7. When no voltage is applied to the first sub-electrode 11, the first and second dielectric layers 3 and 7 cause the droplet 001 to have a large surface tension due to their own hydrophobic property. The second dielectric layer 7 may be made of various materials, such as resin, polyimide, silicon nitride, silicon oxide, and the like, without limitation.

In some embodiments, referring to FIGS. 5 to 9, in a case where the first dielectric layer 3 and the second dielectric layer 7 are made of a material without hydrophobicity, a second hydrophobic layer 8 may be disposed on a side of the second dielectric layer 7 facing away from the second substrate 5, and the first hydrophobic layer 4 may be disposed on the side of the first dielectric layer 3 facing away from the first substrate 2. In this case, the first and second hydrophobic layers 4 and 8 are in direct contact with the droplet 001, so that the droplet 001 has a large surface tension. The materials used in the first dielectric layer 3 and the second dielectric layer 7 may be the same or different. For example, in a case where the first dielectric layer 3 may be made of a material having hydrophobicity and the second dielectric layer 7 may be made of a material having no hydrophobicity, the second hydrophobic layer 8 may be disposed on the side of the second dielectric layer 7 facing away from the second substrate 5, and the first dielectric layer 3 and the second hydrophobic layer 8 are in direct contact with the droplets 001, so that the droplet 001 have a large surface tension. For example, if the first dielectric layer 3 may be made of a material having no hydrophobicity and the second dielectric layer 7 may be made of a material having hydrophobicity, the first hydrophobic layer 4 may be disposed on the side of the first dielectric layer 3 facing away from the first substrate 2, and the first hydrophobic layer 4 and the second dielectric layer 7 are in direct contact with the droplet 001, so that the droplet 001 has a large surface tension. The dielectric constant of the second hydrophobic layer 8 may be the same as or different from that of the second dielectric layer 7, and is not limited herein. The material of the second hydrophobic layer 8 may include various types of materials, for example, fluorine-containing polymers such as teflon, perfluoro resin (CYTOP), etc., and is not limited thereto.

In the microfluidic chip provided by the embodiment of the disclosure, the droplet 001 is controlled based on the voltages applied to the first sub-electrode 11 and the second sub-electrode 12, and the hydrophobicity and the dielectric wetting effect between the hydrophobic layers and the droplet 001, so that the first sub-electrode 11 of the first electrode layer 1 in the operation region can have different arrangement modes according to different functions of different microfluidic units.

Referring back to FIGS. 1 and 2, in the microfluidic unit 100*a* having a function of generating a droplet, the first sub-electrode 11 of the first electrode layer 1 may include a plurality of different types of electrodes. For example, the first sub-electrodes 11 include one trapezoidal sub-electrode 11*a*, two long rectangular sub-electrodes 11*b*, three square electrodes 11*c*, and two short rectangular electrodes 11*d*. The trapezoidal sub-electrodes 11*a*, the long rectangular sub-electrodes 11*b*, and the square electrodes 11*c* are sequentially arranged in the same direction (e.g., a first direction), and the two short rectangular electrodes 11*d* are arranged on both sides of the three square electrodes 11*c* in the arrangement direction (e.g., a second direction perpendicular to the first direction). The second sub-electrode 12 is disposed at a side of the square electrodes 11*c* facing away from the trapezoidal sub-electrode 11*a*. The microfluidic unit 100*a* may be disposed at a liquid inlet of the microfluidic chip, the trapezoidal sub-electrode 11*a* faces the liquid inlet, and an initial droplet enters the microfluidic chip 100*a* and falls into the trapezoidal electrode 11*a* and the long rectangular sub-electrode 11*b*. At this time, the initial droplet has a large area, and the trapezoidal electrode 11*a* can restrict the shape of the initial droplet to avoid its spreading. Next, voltages are sequentially applied to the three square electrodes 11*c* so that the initial droplet is transited from the long rectangular sub-electrodes 11*b* to the square electrodes 11*c*, and the short rectangular electrode 11*d* can restrict the shape of the initial droplet while preventing it from spreading outward in a direction (e.g., a second direction) perpendicular to the alignment direction. When the square electrode 11*c* in the middle is powered off, the initial droplet splits into smaller droplets, thereby completing the droplet generation. The smaller droplet is then driven by the second sub-electrode 12 to move to another adjacent microfluidic unit (e.g., 100*b*).

For another example, in the microfluidic unit 100*b* having a function of controlling the turning of the droplet, the first electrode layer 1 has two groups of first sub-electrodes 11 (e.g., square electrodes), the first group of first sub-electrodes 11 are arranged along the first direction, and the second group of first sub-electrodes 11 are arranged along the second direction, that is, the two groups of first sub-electrodes 11 are arranged in a cross shape. The two ends of the first group of first sub-electrodes 11 in the first direction are respectively provided with two second sub-electrodes 12, and the two ends of the second group of first sub-electrodes 12 in the second direction are respectively provided with two second sub-electrodes 12, so that the droplet can enter the microfluidic unit 100*b* in the first direction or the second direction under the driving of the second sub-electrodes 12, be transferred to the opposite side in the first direction or the second direction, and be moved to another adjacent microfluidic unit (e.g., 100*c*) under the driving of the second sub-electrodes 12.

For another example, in the microfluidic unit 100*c* having a function of mixing different kinds of droplets, the first electrode layer 1 includes a plurality of first sub-electrodes 11 (e.g., square electrodes). Some of the plurality of first sub-electrodes 11 are arranged in a closed loop pattern (e.g., a rectangular pattern) to form a closed moving path, and the remaining first sub-electrodes 11 of the plurality of first sub-electrodes 11 are respectively disposed between the closed loop pattern and the second sub-electrodes 12 in the transition region A1. In this case, different droplets may enter the microfluidic unit 100*c* from the second sub-electrode 12 in the transition region A1 on one side, pass through the first sub-electrode 11 between the second sub-electrodes 12 in the transition region A1 and the closed loop pattern and be mixed by turning around the closed loop pattern. Subsequently, the mixed droplets may flow to the transition region A1 on the other side, and be driven by the second sub-electrode 12 in the transition area A1 on the other side to be moved to another adjacent microfluidic unit (e.g., 100*d*).

For another example, in the microfluidic unit 100*d* having a function of moving the droplet, the first electrode layer 1 includes a plurality of first sub-electrodes 11 (e.g., square electrodes). The plurality of first sub-electrodes 11 are arranged in the first direction, and a plurality of second sub-electrodes 12 are respectively disposed at both ends of the plurality of first sub-electrodes 11 in the first direction. In this case, the droplet entering the microfluidic unit 100*d* may move in the first direction and move to another adjacent microfluidic unit via the second sub-electrode 12.

For another example, in the microfluidic unit 100*e* having the function of splitting the droplet into sub-droplets, the first electrode layer 1 includes a plurality of first sub-electrodes 11, the plurality of first sub-electrodes 11 may include a plurality of sheet-shaped sub-electrodes 11*e* and a hollow sub-electrode 11*f*, and the hollow sub-electrode 11*f* has a hollow portion. When the droplets move to the hollow sub-electrode 11*f*, the droplets may be broken at the hollow portion under the condition of the same voltage because the stress at the non-hollow portion is different from that at the hollow portion. As a result, the position of the hollow portion of the hollow sub-electrode 11*f* is a breaking point of the droplet. The hollow portion may include various types of shapes, such as a circular hole shape, a straight shape, a cross shape, and the like. For example, in FIGS. 1 and 2, the hollow portion is in a cross shape, and two straight line portions of the cross-shaped hollow portion respectively overlap two diagonal lines of the hollow sub-electrode 11*f*. The plurality of sheet-shaped sub-electrodes 11*e* and the hollow sub-electrode 11*f* are arranged along the first direction, the hollow sub-electrode 11*f* is disposed between any two sheet-shaped sub-electrodes 11*e*, and the second sub-electrodes 12 are respectively arranged at two ends of the plurality of sheet-shaped sub-electrodes 11*e* in the first direction. The droplet entering the microfluidic unit 100*d* can move along the first direction under the driving of the sheet-shaped sub-electrode 11*e*, and when the droplet passes through the hollow sub-electrode 11*f*, the droplet is split into smaller droplets (i.e., sub-droplets) at the hollow portion of the hollow sub-electrode 11*f*, so as to complete the splitting of the droplet. The smaller droplets then continues to move in the first direction and moves to another adjacent microfluidic unit (e.g., 100*b*) driven by the second sub-electrode 12 on the other side.

For another example, in the microfluidic unit 100*f* having the function of sampling the droplet, the first electrode layer 1 includes a plurality of first sub-electrodes 11, the plurality of first sub-electrodes 11 may include first rectangular electrodes 11*a* and second rectangular electrodes 11*b*, and an area of one second rectangular electrode 11*b* is larger than an area of one first rectangular electrode 11*a*. The microfluidic unit 100*f* may be disposed at a position corresponding to the last step of the microfluidic chip, and when the droplet for which the biological detection is completed is driven into the microfluidic unit 100*f*, the droplet first flows through the first rectangular electrode 11*a* with a smaller area and then flows through the second rectangular electrode 11*b* with a larger area, so as to increase the area of the droplet, thereby meeting the requirements of the sampling operation on the droplet.

For another example, in the microfluidic unit 100*g* having a function of regulating the temperature of the droplet, the first electrode layer 1 may include a plurality of first sub-electrodes 11 arranged in an array pattern, and the first sub-electrodes 11 are not disposed in a central region of the array pattern. The microfluidic unit 100*g* may also include a heating element R1, and the heating element R1 may include various types of structures. For example, the heating element R1 may be a resistance wire, the heating end of the resistance wire may be located in a central region of the array pattern where the first sub-electrode 11 is not disposed, and the plurality of first sub-electrodes 11 are arranged around the heating end of the resistance wire. The resistance wire may have multiple functions, for example, the resistance wire may heat the droplet flowing into the microfluidic unit

100*g*, and/or the resistance wire may measure the temperature of the droplet flowing into the microfluidic unit 100*g*. In a case where the resistance wire heats the droplet flowing into the microfluidic unit 100*g*, a large driving voltage may be applied to two ends of the resistance wire, and the resistance wire heats up to generate joule heat to heat the droplet; in a case where the resistance wire measures the temperature of droplet flowing into the microfluidic unit 100*g*, since the resistance value of the resistance wire varies with the temperature, and the temperature of the resistance wire may be changed when the droplet flows around the resistance wire, a small operation voltage may be applied to the two ends of the resistance wire to measure the resistance value of the resistance wire, and then the temperature value is obtained according to the resistance-temperature relationship of the resistance wire, thereby realizing the temperature measurement. By combining the two modes, the temperature of the droplet can be detected through the resistance wire, and if the temperature is lower, the droplet can be heated to the preset temperature through the resistance wire. In addition, the microfluidic unit 100*g* may also include various temperature measuring or temperature regulating methods, and the heating element R1 may also have other structures, which are not limited herein.

It should be noted that, since the microfluidic chip formed by combining the plurality of microfluidic units may have an irregular shape, in order to keep the microfluidic chip in a regular shape such as a rectangular shape, the microfluidic chip may further include at least one blank unit 100*i*. The blank unit 100*i* does not have a function of manipulating droplet, and may be configured to supplement the microfluidic chip by being placed at a position related to the irregular shape, so that the microfluidic chip becomes a regular shape as a whole, so as to be stored or clamped conveniently.

The operation process of the microfluidic units of the microfluidic chip provided by the embodiments of the present disclosure for manipulating droplets are described in detail below by taking the manipulation of droplet movement and the manipulation of droplet splitting as examples.

Figure 5A:
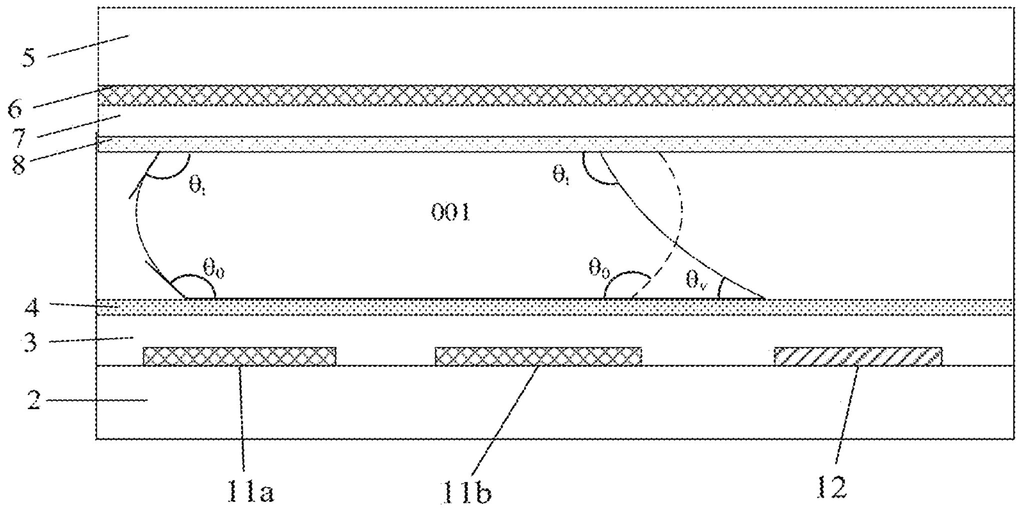
FIG. 5*a* is a schematic diagram illustrating an operation of the microfluidic unit for controlling droplet movement in a microfluidic chip according to an embodiment of the present disclosure.

As shown in FIG. 5*a*, taking a microfluidic unit (e.g., 100*d*) having a function of moving a droplet as an example to describe the function of driving the droplet to move in the microfluidic chip, the first electrode layer 1 on the first substrate 2 includes three electrodes (a first sub-electrode 11*a*, a first sub-electrode 11*b*, and a second sub-electrode 12) spaced apart from each other in sequence from left to right, but this does not constitute a limitation to the embodiment of the present disclosure. When no voltage is applied to the first sub-electrode 11*a*, the first sub-electrode 11*b*, and the second sub-electrode 12, the shape of the droplet 001 is symmetrically distributed (as indicated by a dotted line in FIG. 5*a*), and in this case, the contact angle between the droplet 001 and the first hydrophobic layer 4 is the first initial contact angle $\theta_0$, and the contact angle between the droplet 001 and the second hydrophobic layer 8 is about the second initial contact angle $\theta_t$. If it is desired that the droplet moves toward the second sub-electrode 12 in the transition region A1, a voltage is applied to the second sub-electrode 12, and no voltage or a voltage smaller than the voltage applied to the second sub-electrode 12 is applied to the first sub-electrode 11*a* and the first sub-electrode 11*b*. At this time, due to the dielectric wetting effect, a contact angle between the droplet 001 and the first hydrophobic layer 4 at the right side where the second sub-electrode 12 is disposed changes (e.g., decreases from the first initial contact angle $\theta_0$ to the dielectric contact angle $\theta_V$). Further, since the voltage works almost only for the contact surface between the droplet 001 and the first hydrophobic layer 4, the contact angle (i.e., the second initial contact angle $\theta_t$) between the droplet 001 and the second hydrophobic layer 8 is barely changed, but it is not limited thereto. In this case, the droplet 001 is asymmetrically deformed, and a difference in pressure occurs inside the droplet 001, thereby moving the droplet 001 in a direction (e.g., the first direction) close to the second sub-electrode 12.

Specifically, the relationship of the voltage of any one of the first sub-electrode 11*a*, the first sub-electrode 11*b*, and the second sub-electrode 12 and the contact angle between the droplet 001 and the first hydrophobic layer 4 may be expressed by the following equation:

$$\cos\theta_V = \cos\theta_0 + \frac{\varepsilon_0\varepsilon_r\Delta V^2}{2D\gamma_{lg}}$$

where $\varepsilon_0$ is a vacuum dielectric constant, $\varepsilon_r$ is a relative dielectric constant of the first hydrophobic layer 4, $\gamma_{lg}$ is a surface tension coefficient of a liquid-air interface, ΔV is a potential difference between a lower surface of the first hydrophobic layer 4 close to the first substrate 2 and an upper surface of the first hydrophobic layer 4 close to the droplet 001, and D is a thickness of the first hydrophobic layer 4.

In some embodiments, as can be seen from the above equation, if the relative dielectric constant $\varepsilon_r$ of the first hydrophobic layer 4 is increased, in the case where the same voltage V is applied to any one of the first sub-electrode 11*a*, the first sub-electrode 11*b*, and the second sub-electrode 12, the dielectric contact angle $\theta_V$ of the droplet 001 is increased so that it is easier to manipulate the droplet 001. However, if the relative dielectric constant $\varepsilon_r$ of the first hydrophobic layer 4 is too large, the droplet is easily polarized during the movement, therefore, the manipulation of the droplet 001 by the microfluidic chip is disabled. Accordingly, the first hydrophobic layer 4 in the embodiments of the present disclosure may be made of a material having a relative dielectric constant within a predetermined range, for example, the predetermined range of the relative dielectric constant $\varepsilon_r$ of the first hydrophobic layer 4 is [2.9, 3.1]. The second hydrophobic layer 8 is similar to the first hydrophobic layer 4, for example, the predetermined range of the relative dielectric constant of the second hydrophobic layer 8 is [2.9, 3.1].

Figure 5B:
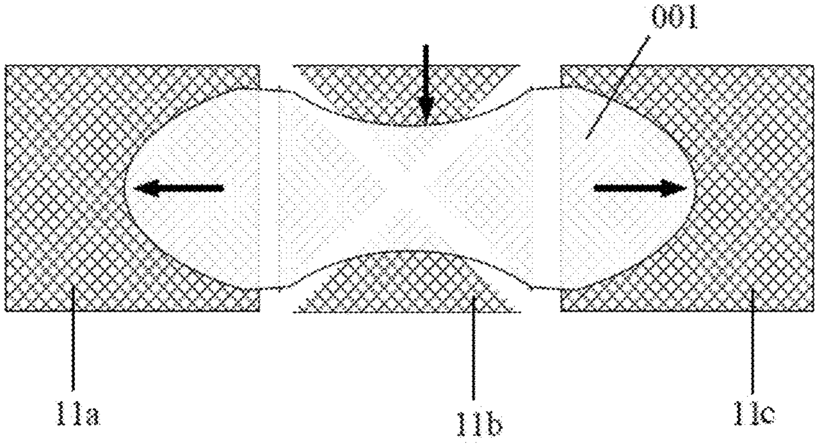
FIG. 5*b* is a schematic diagram illustrating an operation of the microfluidic unit for controlling droplet splitting in the microfluidic chip according to an embodiment of the present disclosure.

As shown in FIG. 5*b*, in the microfluidic chip provided in the embodiment of the present disclosure, the function of splitting droplet based on the dielectric wetting effect in the microfluidic chip is described by taking a microfluidic unit having the function of splitting droplet as an example. The first electrode layer 1 on the first substrate 2 includes three electrodes (a first sub-electrode 11*a*, a first sub-electrode 11*b*, a first sub-electrode 11*c*) spaced apart from each other in an order from left to right, but this does not constitute a limitation on the embodiment of the present disclosure. The first sub-electrode 11*b* is a hollow sub-electrode having a cross-shaped hollow portion for splitting the droplet. For convenience of description, the black arrows in FIG. 5*b* indicate the direction of movement of the droplet, and in this case, the droplet 001 is in contact with the first hydrophobic layer 4 (see FIG. 5*a*) at positions corresponding to the first sub-electrodes 11*a*, 11*b*, and 11*c*. If it is desired to split the droplet 001 into two droplets, a voltage may be applied to the first sub-electrodes 11*a* and 11*c* of the first sub-electrodes 11*a*, 11*b*, and 11*c* which are at two opposite sides, while no voltage or a voltage smaller than the voltages applied to the other two sub-electrodes 11*a* and 11*c* at two opposite sides may be applied to the first sub-electrode 11*b* at the middle position. In this case, electric charges are accumulated at positions of the first hydrophobic layer 4 corresponding to the first sub-electrodes 11*a* and the first sub-electrodes 11*c* on both sides, so that hydrophilicity of portions of the first hydrophobic layer 4 at the first sub-electrodes 11*a* and the first sub-electrodes 11*c* on both sides is increased, thereby attracting the droplet 001 to move to both sides. In addition, since no voltage or a small voltage is applied to the first sub-electrode 11*b* located at the middle position, and the volume of the droplet 001 is constant during the whole movement of the droplet, both ends of the droplet 001 will be pulled to move to both sides, and the middle portion of the droplet 001 will be tapered until being pulled apart. As a result, the droplet is divided into two sub-droplets along the directions of the first sub-electrode 11*a* and the first sub-electrode 11*c* located on both sides and having charges, respectively. In addition, because forces applied to the droplet 001 on the hollow portion and the non-hollow portion of the first sub-electrode 11*b* are different, the droplet 001 always breaks at the hollow portion of the first sub-electrode 11*b*, thereby ensuring that the size of the sub-droplets at the splitting position is constant.

As can be seen from the above process of manipulating the droplet movement, in order to generate a sufficient difference in pressure inside the droplet 001 to drive the droplet 001 to move, the droplet 001 needs to cover at least two adjacent electrodes (two first sub-electrodes 11, or a first sub-electrode 11 and a second sub-electrode 12).

Figure 6:
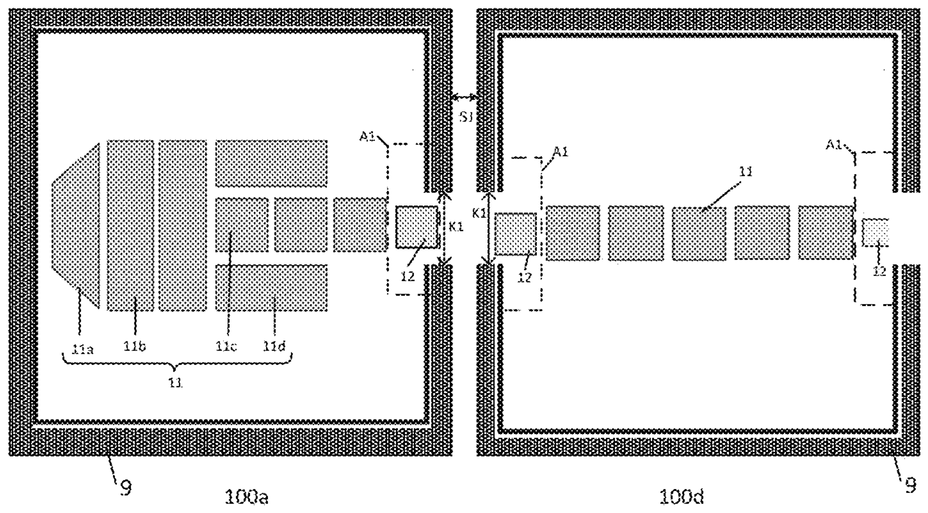
FIG. 6 is a top view of the microfluidic chip according to an embodiment of the present disclosure.
Figure 7:
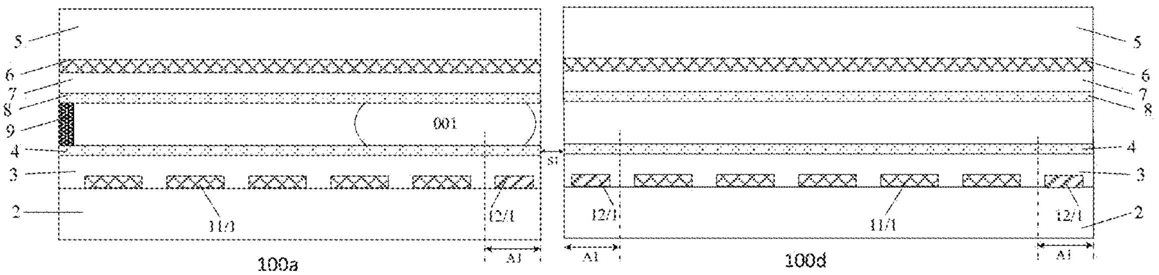
FIG. 7 is a layer structural diagram of the microfluidic chip of FIG. 6.

For example, referring to FIGS. 6, 7, it is illustrated an example of combining the microfluidic unit 100*a* and the microfluidic unit 100*d*. During the process of the droplet 001 crossing the microfluidic unit 100*a* and the microfluidic unit 100*d*, the droplet 001 should cover the second sub-electrode 12 in the transition region A1 of the microfluidic unit 100*a* and the second sub-electrode 12 in the transition region A1 of the microfluidic unit 100*d* closest to the microfluidic unit 100*a*.

No voltage is applied to the second sub-electrode 12 of the microfluidic unit 100*a* and a voltage is applied to the second sub-electrode 12 of the microfluidic unit 100*d* to drive the droplet 001 to move towards the second sub-electrode 12 of the microfluidic unit 100*d*. However, due to inevitable factors such as low alignment accuracy, a gap S1 exists at the interface between the microfluidic unit 100*a* and the microfluidic unit 100*d*, which will cause a part of the droplet 001 flowing through the gap S1 to be pressed into the gap S1, while the total volume of the droplet 001 is constant, resulting in that the coverage area of the droplet 001 is greatly reduced. As a result, the droplet 001 may not cover the second sub-electrode 12 of the microfluidic unit 100*a* and the second sub-electrode 12 of the microfluidic unit 100*d* at the same time, and the droplet 001 cannot move to the microfluidic unit 100*d*.

In order to avoid the above situation, in the embodiment of the present disclosure, an area of an orthographic projection of one second sub-electrode 12 of the microfluidic unit on the first substrate 2 may be smaller than an area of an orthographic projection of one first sub-electrode 11 on the first substrate 2. In this way, it is ensured that the second sub-electrode 12 of each of the adjacent microfluidic units can be covered by the droplet 001 during the movement between the transition regions A1 of the adjacent microfluidic units, thereby achieving the movement of the droplet 001. In addition, the area ratio of the orthographic projection of the first sub-electrode 11 to the orthographic projection of the second sub-electrode 12 may be set as needed, and is not limited herein.

However, if the area of the second sub-electrode 12 is too small, the second sub-electrode 12 may not have enough driving ability. Therefore, in some embodiments, the ratio of the area of the orthographic projection of one second sub-electrode 12 on the first substrate 2 to the area of the orthographic projection of one first sub-electrode 11 on the first substrate 2 is 1:9 to 1:2. In the present embodiment, an example in which the ratio of the area of the orthographic projection of one second sub-electrode 12 on the first substrate 2 to the area of the orthographic projection of one first sub-electrode 11 on the first substrate 2 is 1:4 is described, but the present disclosure is not limited thereto.

It should be noted that in order to ensure that the droplet can move from one microfluidic unit to another, the second sub-electrode 12 in each microfluidic unit should be as close as possible to the edge of the adjacent microfluidic unit, and the edges of the first substrates 2 of the adjacent two microfluidic units should be aligned with each other. Such an arrangement enables adjacent microfluidic units to be as close as possible and the gap S1 between the second sub-electrodes 12 of two adjacent microfluidic units to be as small as possible.

Figure 8:
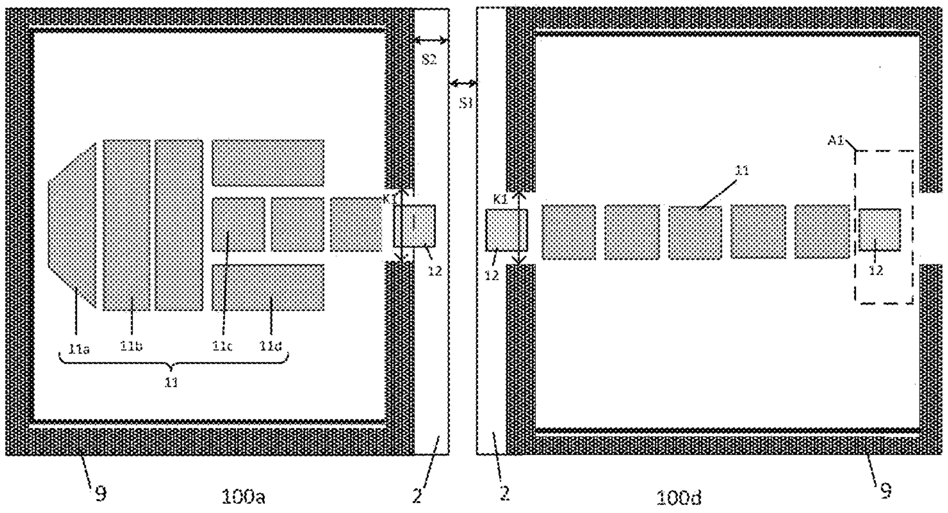
FIG. 8 is a top view of the microfluidic chip according to another embodiment of the present disclosure.
Figure 9:
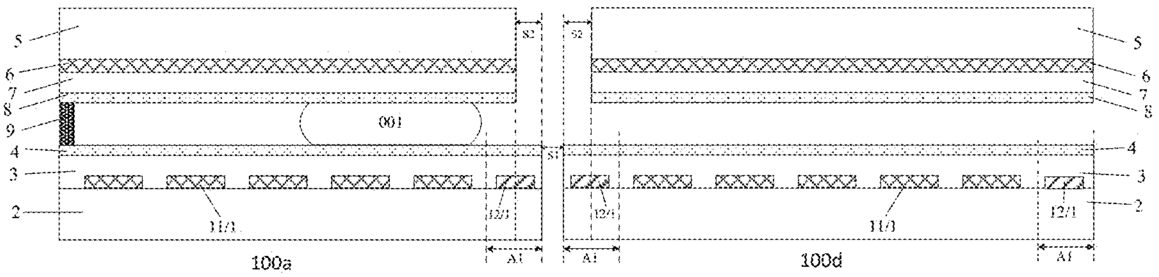
FIG. 9 is a layer structural diagram of the microfluidic chip of FIG. 8.

In some embodiments, for example, referring to FIGS. 8 and 9, the microfluidic units 100*a* and 100*d* adjacent to each other in the first direction each have a first substrate 2 and a second substrate 5, where the first substrate 2 and the second substrate 5 are aligned with and opposite to each other to form a microfluidic unit. However, due to inevitable factors such as low alignment accuracy, the second substrate 5 and the first substrate 2 may not be perfectly aligned. Furthermore, in the microfluidic chip provided in the embodiments of the present disclosure, the droplet 001 moves mainly on the first substrate 2, and when the orthographic projection of the second substrate 5 of the microfluidic unit 100*a* on the first substrate 2 does not cover the orthographic projection of the right edge of the transition region A1 (i.e., the transition region A1 adjacent to the microfluidic unit 100*d*) on the right side of the microfluidic unit 100*a* on the first substrate 2 (i.e., there is a misalignment distance S2 between the second substrate 5 of the microfluidic unit 100*a* and the first substrate 2 on the right side), and/or when the orthographic projection of the second substrate 5 of the microfluidic unit 100*d* on the first substrate 2 does not cover the orthographic projection of the left edge of the transition region A1 (i.e., the transition region A1 adjacent to the microfluidic unit 100*a*) on the left side of the microfluidic unit 100*d* on the first substrate 2 (i.e., there is a misalignment distance S2 between the second substrate 5 of the microfluidic unit 100*d* and the first substrate 2 on the left side), the droplet 001 is more easily squeezed into the gap S1 between the second sub-electrodes 12 of two adjacent microfluidic units.

The orthographic projection of the second substrate 5 on the first substrate 2 may at least partially overlap the orthographic projection of the second sub-electrode 12 on the first substrate 2 to ensure that the gap S1 between the second substrates 5 of two adjacent microfluidic units is not too large, thereby avoiding the droplet 001 from being squeezed into the gap S1 and ensuring that the movement of the droplet is smoothly completed. In addition, when the orthographic projection of the second substrate 5 of each microfluidic unit on the first substrate 2 covers the orthographic projection of the edge of the transition region A1 of the microfluidic unit adjacent to another microfluidic unit on the first substrate 2, the edge of the second substrate 5 of each microfluidic unit adjacent to another microfluidic unit and the edge of the transition region A1 of the microfluidic unit adjacent to another microfluidic unit coincide with the dotted line as in FIG. 8, so that the droplet 001 can be prevented from being squeezed into the gap S1, and can be prevent the area covered by the droplet 001 from being drastically reduced.

In some embodiments, referring to FIGS. 6 to 9, in the microfluidic chip provided in the embodiments of the present disclosure, each microfluidic unit may include a bonding layer 9 in addition to the first substrate 2 and the second substrate 5. The bonding layer 9 is disposed between the first substrate 2 and the second substrate 5 (specifically, between the hydrophobic layer on the first substrate 2 and the hydrophobic layer on the second substrate 5) and at an edge region of the second substrate 5. The bonding layer 9 provide support between the first substrate 2 and the second substrate 5 to form a certain accommodation space for accommodating the droplet 001 and providing a flow channel for the movement of the droplet 001. The bonding layer 9 may be made of a frame sealing adhesive or the like, and in order to improve the supporting ability of the bonding layer 9, a plurality of supporting balls or the like may be added to the frame sealing adhesive, which is not limited herein. As shown in FIGS. 6-9, the bonding layer 9 of each microfluidic unit has a first opening K1 at one side close to the adjacent microfluidic unit, so that the droplet 001 can pass through the first opening K1. The first openings K1 of any two adjacent microfluidic units are disposed opposite to each other, so that the droplet 001 moves from the first opening K1 of one microfluidic unit to the first opening K1 of the other microfluidic unit to enter the other microfluidic unit. It should be noted that, as shown in FIGS. 8 and 9, since the first substrate 2 and the second substrate 5 in the same microfluidic unit have a misalignment distance S2 at the boundary between two adjacent microfluidic units, in order to ensure the sealing property, the bonding layer 9 may be disposed at the edge of the side where the first substrate 2 and the second substrate 5 are aligned with each other, and aligned with the edge of the second substrate 5.

Figure 10:
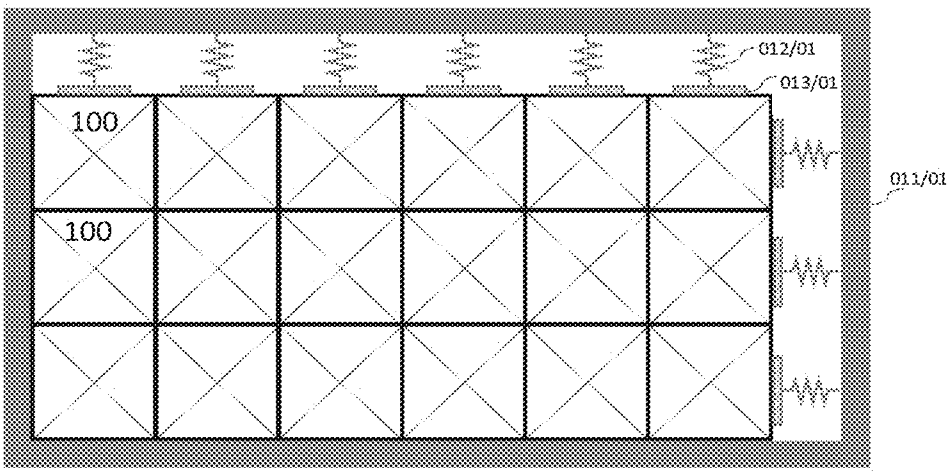
FIG. 10 is a first top view of the microfluidic chip (including a fixation assembly) according to an embodiment of the present disclosure.
Figure 11:
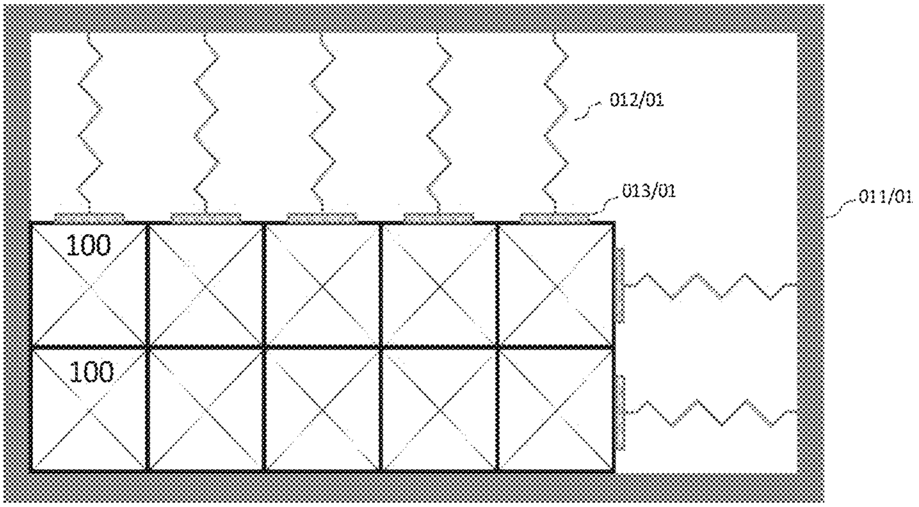
FIG. 11 is a second top view of the microfluidic chip (including a fixation assembly) according to an embodiment of the present disclosure.
Figure 12:
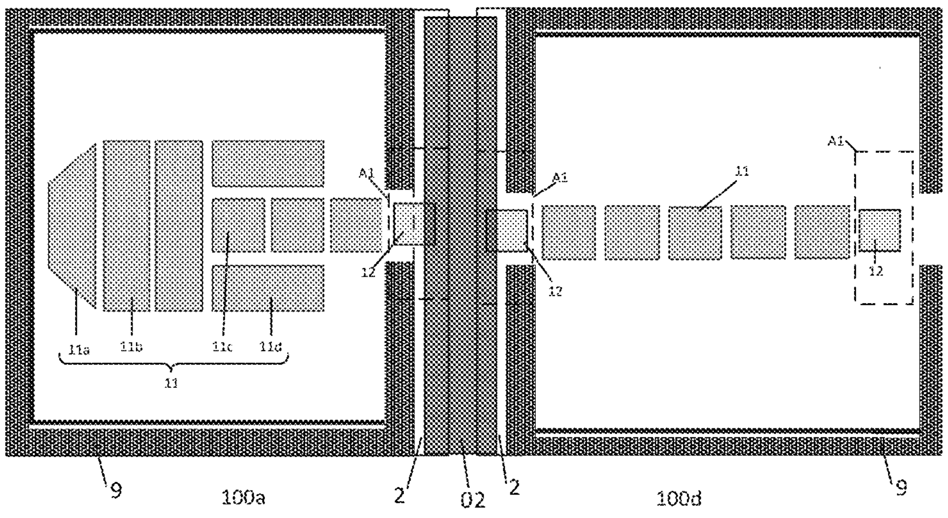
FIG. 12 is a top view of the microfluidic chip (including bonding structures) according to an embodiment of the present disclosure.

In some embodiments, referring to FIGS. 10 and 11, a plurality of microfluidic units are combined to form a microfluidic chip. In order to stabilize the combined microfluidic units, the microfluidic chip may further include a fixation assembly 01, and the fixation assembly 01 is used for fixing the plurality of microfluidic units to form the microfluidic chip.

The fixation assembly may include various types of structures, for example, the fixation assembly 01 may include an outer frame 011 and a plurality of springs 012 and a plurality of stoppers 013 disposed within the outer frame. The outer frame 011 encloses the plurality of microfluidic units 100 combined with each other therein, and has a rectangular shape. One end of each of the plurality of springs 012 is connected to at least two side walls (i.e., inner side walls) (e.g., right and upper sides) of the outer frame 011 near the plurality of microfluidic units 100, and the other end of each of the plurality of springs 012 is connected to one stopper 013.

One stopper 013 corresponds to one microfluidic unit 100, for example, the microfluidic units 100 located on the outermost sides (e.g., upper and right sides) among the microfluidic units 100 combined with each other may be respectively in contact with one stopper 013. When the plurality of stoppers 013 are respectively in contact with some of the plurality of microfluidic units located at the outer edge, the other microfluidic units located at the outer edge of the plurality of microfluidic units are in contact with the other inner side walls (e.g., left and lower sides) of the outer frame 011, and the springs 012 are in a compressed state (i.e., their natural length (length without force) is smaller than the distance between the inner side wall of the outer frame 011 connected thereto and the stoppers 013), the restoring force of the plurality of springs 012 is applied to the plurality of microfluidic units. Specifically, since the springs 012 are in a compressed state, under the restoring force of the compressed springs 012, the plurality of stoppers 013 may apply a force to the inside of the microfluidic unit 100 in contact therewith (for example, as shown in FIG. 10, the springs 012 at the upper-side apply a downward force to the microfluidic unit 100 through the corresponding stoppers 013, and the springs 012 at the right-side apply a leftward force to the microfluidic unit 100 through the corresponding stoppers 013) to confine the plurality of microfluidic units 100 within the outer frame 011 of the fixation assembly 01, and the plurality of microfluidic units 100 are aligned and in closely contact with each other, thereby reducing a gap between adjacent microfluidic units 100 in the plurality of microfluidic units 100. However, when the spring 012 is in an elongated state or a natural state, since the microfluidic unit 100 is subjected to no force or is subjected to a force towards the outside of the microfluidic unit, the plurality of microfluidic units 100 are easily scattered and are difficult to align with each other.

In addition, the shape of the inner wall of the outer frame 011 can be fitted to the shape of the microfluidic unit 100 of the microfluidic chip formed by combining a plurality of microfluidic units 100. The length of the spring 012 may be adjusted according to the number and size of the microfluidic units 100.

Because the compression length of the spring 012 has a certain range when the springs 012 are used to fix a plurality of microfluidic units 100, the fixation assembly 01 can be compatible with microfluidic chips formed by combining microfluidic units 100 with various sizes in a certain range. For example, referring to FIG. 11, although the number of microfluidic units 100 in FIG. 11 is less than the number of microfluidic units 100 in FIG. 10 and the compression amount of the springs 012 in FIG. 11 is also smaller than that of the springs 012 in FIG. 10, the plurality of microfluidic units 100 can be fixed as long as the springs 012 are in a compressed state.

In some embodiments, in order to accommodate the shapes of the microfluidic chips formed by combining the plurality of microfluidic units 100, the springs 012 and the stoppers 013 may be fixed in a detachable connection manner, and the springs 012 and the inner wall of the outer frame 011 may also be fixed in a detachable connection manner, so as to replace springs of different specifications according to the number and size of the microfluidic chips, which is not limited herein.

In some embodiments, in order to apply the restoring force generated by the compressed springs 012 to the microfluidic units 100 by the stoppers 013, the thickness of the stoppers 013 may be greater than the thickness of each microfluidic unit 100 in a third direction perpendicular to the first direction and the second direction.

Figure 13:
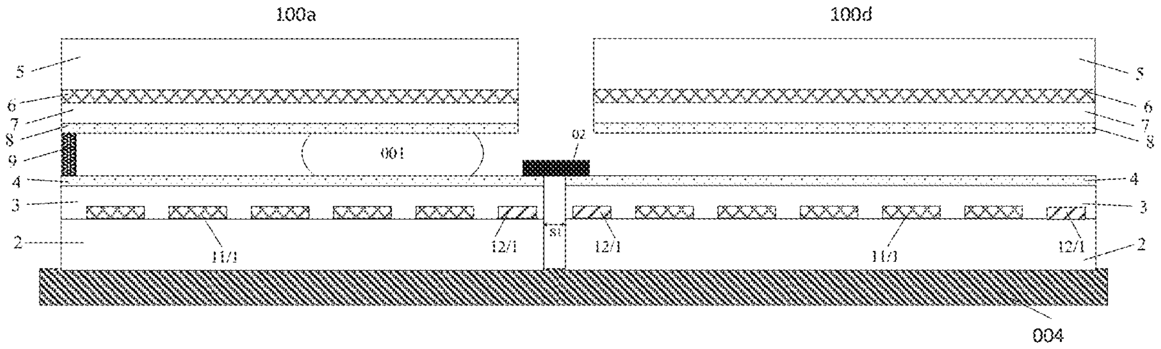
FIG. 13 is a layer structural diagram of the microfluidic chip of FIG. 12.

In some embodiments, referring to FIG. 13, the microfluidic chip provided by the embodiment of the present disclosure may further include a flat support layer 004, an upper surface and a lower surface of the flat support layer 004 are flat, and the respective microfluidic units (e.g., 100*a* and 100*d*) may be disposed on the upper surface of the flat support layer 004, so that the respective microfluidic units may be at the same level. For example, the upper surfaces of the first substrates 2 of the respective microfluidic chips may be at the same level, and thus, the droplet 001 can move between the respective microfluidic units along the channels at the same level, which may improve the reliability of the microfluidic chips.

In some embodiments, referring to FIG. 13, the microfluidic chip provided by the embodiments of the present disclosure may further include at least one adhesive structure 02, and the adhesive structure 02 may be disposed in a transition region of two adjacent microfluidic units (e.g., 100*a* and 100*b* in FIG. 13) and may be disposed on the first substrate 2 (specifically, the hydrophobic layer on the first substrate 2) to fix the adjacent microfluidic units to ensure that the two are not displaced from each other. In a case where the first dielectric layer 3 and the first hydrophobic layer 4 are provided on the first substrate 2, the adhesive structure 02 may be arranged on a side of the first hydrophobic layer 4 facing away from the first substrate 2. In order to ensure the hydrophobicity between the droplet 001 and the contact surface thereof, the surface of the bonding structure 02 facing away from the first substrate 2 may be made of hydrophobic material, such as CYTOP, etc., however, other materials may also be used, and are not limited herein. In addition, in order to avoid the adhesive structure 02 from being too thick and affecting the movement of the droplet 001, the adhesive structure 02 may be as thin as possible. For example, the thickness of the adhesive structure 02 may be less than 0.1 mm, which is not limited herein.

In summary, each microfluidic unit of the plurality of microfluidic units may have different functions according to the arrangement of the first sub-electrodes 11, and the microfluidic chip formed by combining different microfluidic units can perform different biological detections. An example of a microfluidic chip formed by combining the microfluidic chip shown in FIG. 1 and the microfluidic chip shown in FIG. 2 will be described below.

Example 1

As shown in FIG. 1, the microfluidic chip can mix two types of droplets and then separate the mixed droplets into two samples.

Specifically, the microfluidic chip includes two microfluidic units 100*a* having a function of generating droplets, two microfluidic units 100*b* having a function of controlling the turning of the droplet, one microfluidic unit 100*c* having a function of mixing different kinds of droplets, one microfluidic unit 100*d* having a function of moving the droplet, one microfluidic unit 100*e* having a function of splitting the droplet into sub-droplets, and one microfluidic unit 100*f* having a function of sampling the droplet, which are arranged in the form of a 4×2 array, where a first row of the array includes the microfluidic units 100*a*, 100*b*, 100*c*, and 100*d* in an order from left to right, and a second row of the array includes the microfluidic units 100*a*, 100*b*, 100*e*, and 100*f* in an order from left to right. The biological reaction process of the microfluidic chip is as follows.

In S1, a reagent of the first droplet and a reagent of the second droplet are respectively introduced through the two microfluidic units 100*a* for droplet generating in the first and second rows of the array, and two droplets are generated.

In S2, the first droplet enters the microfluidic unit 100*b* for controlling the turning of the droplet in the first row from the microfluidic unit 100*a* in the first row and then enters the microfluidic unit 100*c* for mixing. The second droplet enters the microfluidic unit 100*b* for controlling the turning of the droplet in the second row from the microfluidic unit 100*a* in the second row, and then turns to enter the microfluidic unit 100*b* for controlling the turning of the droplet in the first row, and turns again to enter the microfluidic unit 100*c* for mixing in the first row. In this case, the two kinds of droplets are uniformly mixed after several turns in the microfluidic unit 100*c* for mixing different kinds of droplets in the first row.

In S3, the droplet after uniform mixing returns to the microfluidic unit 100*b* in the first row again, then turns to enter the microfluidic unit 100*b* in the second row, and turns again to enter the microfluidic unit 100*e* for splitting, and the droplet is split into two sub-droplets uniformly.

In S4, the two sub-droplets sequentially enter the microfluidic unit 100*f* for sampling, and are sampled separately, thereby completing the reaction flow.

Example 2

As shown in FIG. 2, the microfluidic chip can mix two types of droplets, and heat and then sample the mixed droplets.

Specifically, the microfluidic chip includes, in the form of a 2×5 array, two microfluidic units 100*a* having a function of generating the droplet, two microfluidic units 100*b* having a function of controlling the turning of the droplet, one microfluidic unit 100*c* having a function of mixing different kinds of droplets, one microfluidic unit 100*g* having a function of regulating a temperature of the droplet, one microfluidic unit 100*f* having a function of sampling the droplets, and three blank units 100*i*, where the three blank units 100*i* are disposed to combine the above microfluidic units 100 into a regular array, and the three blank units 100*i* may also be omitted. The first row of the array includes, from left to right, the microfluidic units 100*a*, 100*b*, 100*c*, 100*g* and 100*f*; the second row of the array includes, from left to right, the microfluidic units 100*a*, 100*b* and three 100*i*. The biological reaction process of the microfluidic chip is as follows.

In S1, the reagent of the first droplet and the reagent of the second droplet are respectively introduced through the two microfluidic units 100*a* for droplet generation in the first and second rows of the array, and two droplets are generated.

In S2, the first droplet enters the microfluidic unit 100*b* for controlling the turning of the droplet in the first row from the microfluidic unit 100*a* in the first row, and then enters the microfluidic unit for mixing 100*c*. The second droplet enters the microfluidic units 100*b* for controlling the turning of the droplet in the second row from the microfluidic units 100*a* in the second row, then turns to enter the microfluidic units 100*b* for controlling the turning of the droplet in the first row, and turns again to enter the microfluidic units 100*c* for mixing in the first row. In this case, the two kinds of droplets are uniformly mixed after several turns in the microfluidic unit 100*c* for mixing different kinds of droplets in the first row.

In S3, the uniformly mixed droplets are moved from the microfluidic units 100*c* for mixing different kinds of droplets in the first row to the microfluidic unit 100*g* for regulating a temperature of the droplet, and the droplet turns along the first sub-electrode 11 for a desired reaction time.

In S4, the droplet after the completion of the reaction enters the microfluidic unit 100*f* for sampling from the microfluidic unit 100*g* for regulating a temperature of the droplet, and is sampled, thereby completing the reaction flow.

Of course, the foregoing are only two exemplary combinations of the microfluidic chip provided in the embodiments of the present disclosure, and different microfluidic units can also be combined in different ways according to different reaction requirements to adapt to multiple reactions, which is not limited herein.

Figure 14:
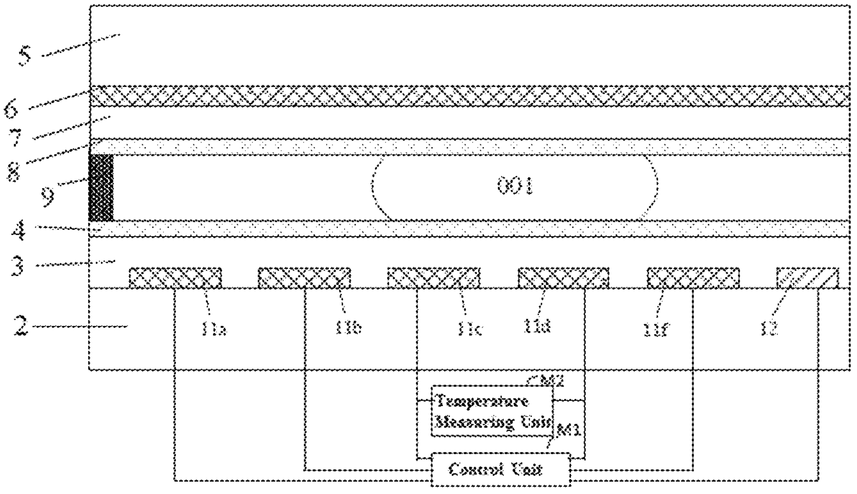
FIG. 14 is a schematic structural diagram of the microfluidic chip (including a temperature measuring unit) according to an embodiment of the present disclosure.

Referring to FIG. 14, in some embodiments, the microfluidic chip provided in the embodiments of the present disclosure may further include a control unit M1 electrically connected to each of the first sub-electrodes 11 and the second sub-electrode 12 in each microfluidic unit to drive each of the first sub-electrode 11 and the second sub-electrode 12. The control unit M1 includes a programmable power supply and a programmable logic controller, and may control the voltages of each of the first sub-electrodes 11 and the second sub-electrode 12, respectively.

For most biochemical reactions, the reaction temperature is critical to the reaction result, and therefore, it is necessary to detect and control the temperature of the reaction process in the microfluidic chip. Thus, referring to FIG. 14, the microfluidic chip provided in the embodiment of the present disclosure further includes a temperature measuring unit M2 coupled to at least one microfluidic unit of the plurality of microfluidic units (e.g., coupled to at least two adjacent first sub-electrodes 11 of at least one microfluidic unit of the plurality of microfluidic units). For example, the temperature measuring unit M2 may be coupled to the microfluidic unit 100*g* for regulating a temperature of the droplet, and the temperature measuring unit M2 is used to detect the temperature of a droplet flowing through the first sub-electrode 11 coupled to the temperature measuring unit M2.

Referring to FIG. 14, the microfluidic unit of the microfluidic chip includes two substrates (e.g., a first substrate 2 and a second substrate 5). When the droplet 001 is located on the adjacent first sub-electrode 11*c* and first sub-electrode 11*d*, the first sub-electrode 11*c* and first sub-electrode 11*d* may serve as a lower plate, the reference electrode 6 may serve as an upper plate, and thus a capacitor C(T) may be formed between the lower plate and the upper plate, each layer structure between the lower plate and the upper plate and the droplet 001 may serve as a capacitance medium to form different capacitors, and the capacitors are coupled in series. If C1 is a capacitance of the capacitor formed by the first dielectric layer 3/the second dielectric layer 7 as the capacitance medium, C2 is a capacitance of the capacitor formed by the first hydrophobic layer 4/the second hydrophobic layer 8 as the capacitance medium, $C_{13}(T)$ is a capacitance of the capacitor formed by the droplet 001 as the capacitance medium, and $C_3$ is a capacitance of the capacitor formed by the silicone oil between the droplets as the capacitance medium, then since the thickness of the droplet 001 is much greater than the thickness of the other layer structures (e.g., the first dielectric layer 3, the second dielectric layer 7, the first hydrophobic layer 4, the second hydrophobic layer 8, etc.) in the microfluidic unit, the capacitance $C_{13}(T)$ is typically tens to hundreds times that of the other media, and thus, the total capacitance C(T) is approximately equal to the capacitance $C_{13}(T)$ of the droplet, i.e., as described by the following equation:

$$C(T) = \frac{C_1 // C_2 // C_{13}(T) // C_3}{2} \approx \frac{C_{13}(T)}{2}. \quad (1)$$

Figure 15:
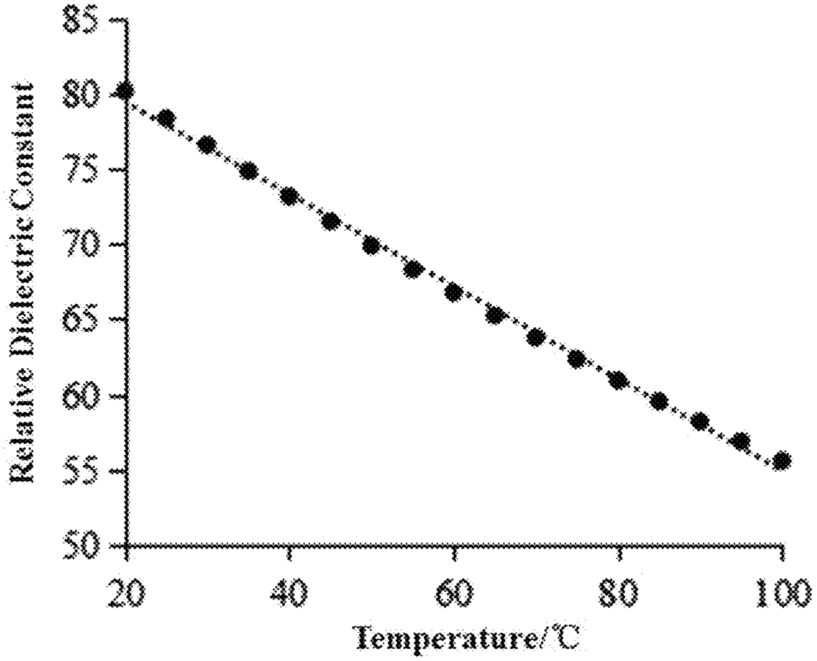
FIG. 15 is a graph of temperature versus relative dielectric constant of the droplet (water) in the microfluidic chip according to an embodiment of the present disclosure.

Referring to FIG. 15, the relative dielectric constant of droplet 001 can vary with temperature, and when droplet 001 is water, the sensitivity of the relative dielectric constant of the water to temperature change is 0.3066/° C., and thus the temperature change can be characterized by detecting the capacitance of C(T), as shown in the following equation:

$$C(T) = \frac{\varepsilon_0 \varepsilon_r(T) A}{2d}, \quad (2)$$

where $\varepsilon_0$ is the vacuum dielectric constant, $\varepsilon_r(T)$ is the relative dielectric constant of the droplet 001 that changes with temperature, A is an area of the first sub-electrode 11*c* or the first sub-electrode 11*d* (the first sub-electrode 11*d* has the same area as the first sub-electrode 11*c*), and d is the thickness of the droplet 001.

Further, the moving position of the droplet 001 can be monitored by detecting the capacitance of C(T). For example, when there is no droplet 001 between the first sub-electrode 11*c*, the first sub-electrode 11*d*, and the reference electrode 6, $\varepsilon_r(T)$ in equation (2) is the relative dielectric constant of the medium around the droplet 001. The medium around the droplet may include air, silicone oil, etc., where the air has a relative dielectric constant of 1, and the silicone oil has a relative dielectric constant of 2.6. In this case, there is a difference of several tens of times between the empty capacitance that can be measured and the capacitance of the capacitor C(T) (hereinafter referred to as the detection capacitor) when the droplet is present, and it is thereby possible to determine whether or not there is a droplet 001 on the first sub-electrode 11*c* and the first sub-electrode 11*d*.

Figure 16:
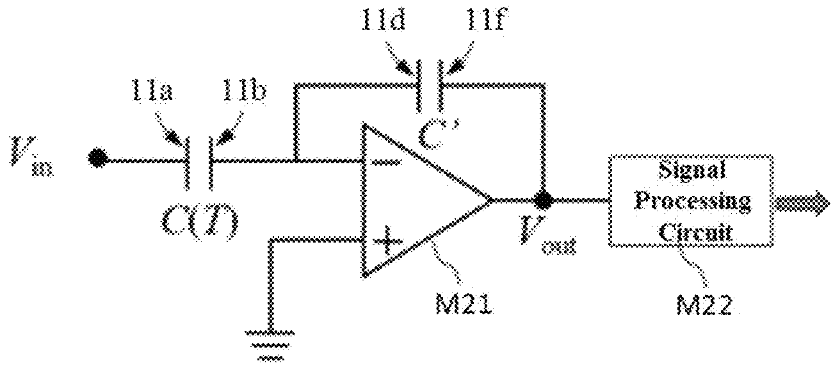
FIG. 16 is a circuit diagram of a temperature measuring unit of the microfluidic chip according to an embodiment of the present disclosure.

In some embodiments, the temperature measuring unit M2 may include a variety of configurations. For example, as shown in FIG. 16, the temperature measuring unit M2 may include an operational amplifier M21, a signal processing circuit M22 and a feedback capacitor C'. The operational amplifier M21 has a first input port (−), a second input port (+) and an output port, and the first input port of the operational amplifier M21 is coupled to the first sub-electrode 11 (e.g., the first sub-electrodes 11*b* and 11*c* in FIG. 14) coupled to the temperature measuring unit M2. The feedback capacitor C' is coupled between the first input port and the output port of the operational amplifier M21, the signal processing circuit M22 is coupled to the output port of the operational amplifier M21, and the second input port of the operational amplifier M21 is grounded, where the signal processing circuit M22 can further amplify the signal and obtain an digital sensing signal through analog-to-digital conversion. The capacitance of the feedback capacitor C' is a reference capacitance, the capacitance medium of the feedback capacitor C' does not change with temperature, and the capacitance of the feedback capacitor C' should be the same as the capacitance between the first sub-electrode 11*c*, the first sub-electrode 11*d*, and the reference electrode 6 without the droplet 001. The first input port is a positive terminal, and the second input port is a negative terminal, so that the temperature measuring unit can be used as a proportional amplifying circuit of the temperature measuring unit M2, and the input and output relations of the circuit are as follows:

$$V_{out} = \frac{C}{C'} V_{in}.$$

When the changes in the temperature is ΔT, an amount of change in output voltage is:

$$\Delta V_{out} = \frac{\Delta C}{C'} V_{in} = \frac{\Delta \varepsilon_r}{\varepsilon_r'} V_{in}.$$

The relative dielectric constant of the droplet 001 changes 0.3066 per 1° C. change in temperature, while the relative dielectric constant of the medium of the feedback capacitor C' (e.g., a medium (e.g., air) around the droplet) does not change with the change in temperature, so that the relative dielectric constant of the air medium ($\varepsilon_r'=1$) can be obtained, and thus the amount of change in the output voltage is 30.66% Vin. Assuming that the capacitance medium of the feedback capacitor C' is silicone oil, the relative dielectric constant $\varepsilon_r'=2.6$ of the silicone oil medium, and the variation of the output voltage is 11.79% Vin, which enables the proportional amplifying circuit included in the temperature measuring unit M2 to reduce the difficulty of detection and improve the sensitivity of temperature detection.

Figure 17:
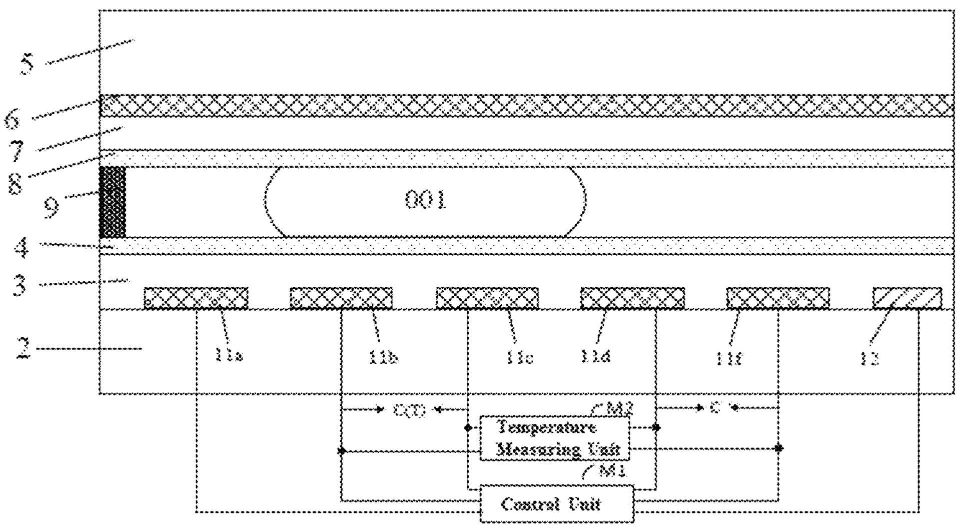
FIG. 17 is a schematic structural diagram of the microfluidic chip (including a feedback capacitor) according to an embodiment of the present disclosure.

In some embodiments, since the capacitance of the feedback capacitor C' is the reference capacitance, the relative dielectric constant of the capacitance medium of the feedback capacitor C' does not change with temperature, and the capacitance of the feedback capacitor C' should be the same as the capacitance between the first sub-electrode 11*c*, the first sub-electrode 11*d*, and the reference electrode 6 without the droplet 001, two adjacent first sub-electrodes 11 may be directly used as the lower plate of the feedback capacitor C'. Specifically, referring to FIG. 17, the first sub-electrodes 11*a* to 11*d* and 11*f* are sequentially arranged, and in a case where the first sub-electrode 11*b* and the first sub-electrode 11*c* are coupled to the temperature measuring unit M2 as the capacitor C(T) to be detected, the temperature measuring unit M2 is also coupled to the first sub-electrode 11*d* and the first sub-electrode 11*f*. The first sub-electrode 11*d* and the first sub-electrode 11*f* serve as lower plates and the reference electrode 6 serves as an upper plate to form a feedback capacitor C', and when the droplet 001 moves onto the first sub-electrode 11*b* and the first sub-electrode 11*c* instead of the first sub-electrode 11*d* and the first sub-electrode 11*f*, the capacitance formed between the first sub-electrode 11*d* and the first sub-electrode 11*f* and the reference electrode 6 serves as the capacitance of the feedback capacitor C'. Specifically, one of the first sub-electrode 11*d* and the first sub-electrode 11*f* may be coupled to the first input port of the operational amplifier M21, and the other may be coupled to the output port of the operational amplifier M21.

In some embodiments, in order to ensure the accuracy of detection, at least one first sub-electrode may be included between the first sub-electrodes 11 forming the feedback capacitor C' and a detection capacitor C(T), so that it is possible to prevent the occurrence of signal crosstalk due to the droplet 001 simultaneously covering the first sub-electrodes 1 forming the feedback capacitor C' and the detection capacitor C(T).

Figure 19:
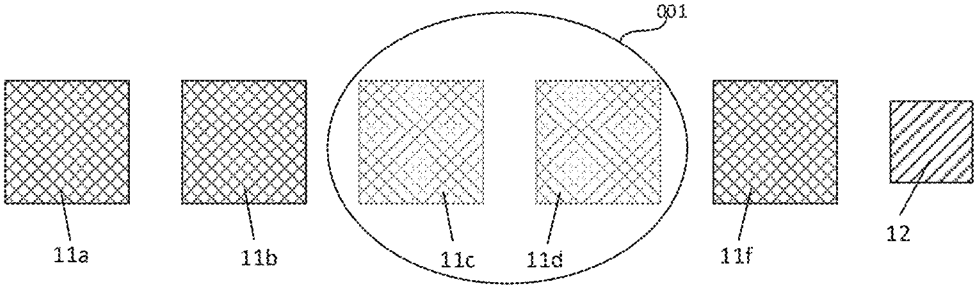
FIG. 19 is a schematic structural diagram of a first sub-electrode of the microfluidic chip according to an embodiment of the present disclosure.
Figure 20:
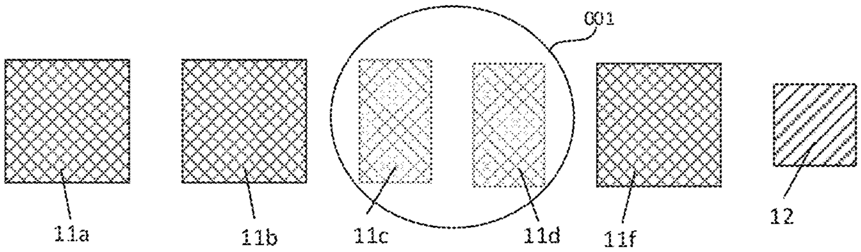
FIG. 20 is a schematic structural diagram of the first sub-electrode of the microfluidic chip according to another embodiment of the present disclosure.

In some embodiments, referring to FIGS. 19 and 20, in order to ensure the accuracy of the measurement, the droplet 001 to be measured should cover at least the two first sub-electrodes 11*c* and 11*d* coupled to the temperature measuring unit M2, so the size of the first sub-electrode 11 coupled to the temperature measuring unit M2 can be adjusted. As an example, as shown in FIG. 19, the size of the first sub-electrode 11 coupled to the temperature measuring unit M2 may be the same as the size of the first sub-electrode 11 not coupled to the temperature measuring unit M2, and each of the first sub-electrodes 11 can provide a sufficient driving force to the droplet 001. As another example, as shown in FIG. 20, the first sub-electrode 11 coupled to the temperature measuring unit M2 may have a size different from that of the first sub-electrode 11 not coupled to the temperature measuring unit M2. For example, the size of the first sub-electrode 11 coupled to the temperature measuring unit M2 can be smaller than the size of the first sub-electrode 11 not coupled to the temperature measuring unit M2, which can ensure that the droplet 001 covers both first sub-electrodes 11 for temperature measurement at the same time. Further, the size of the first sub-electrode 11 may be set according to the size of the droplet 001 to be driven and the required detection sensitivity, and is not limited herein.

Figure 18:
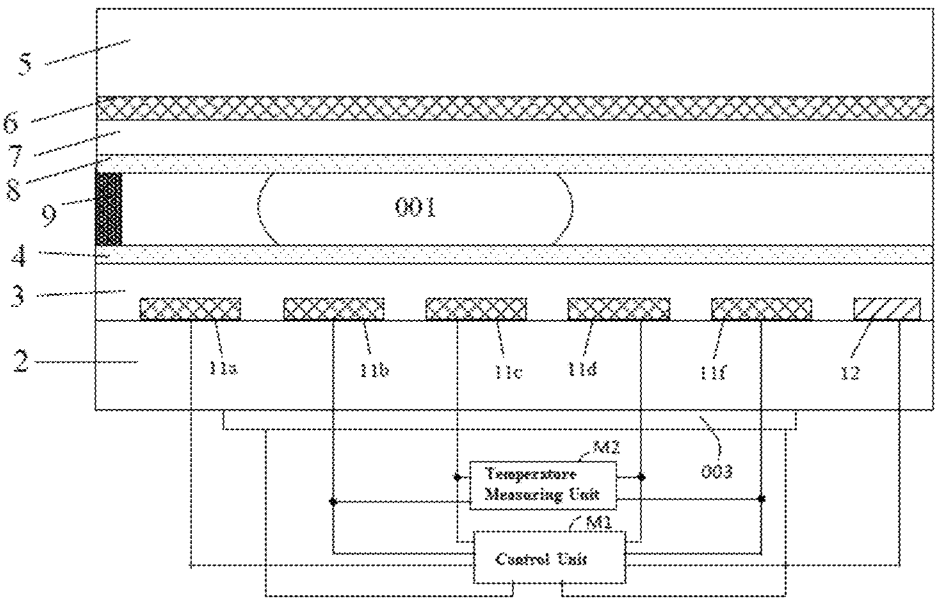
FIG. 18 is a schematic structural diagram of the microfluidic chip (including a temperature adjusting unit) according to an embodiment of the present disclosure.

In some embodiments, as shown in FIG. 18, the microfluidic chip may further include a temperature adjusting unit 003, both the temperature measuring unit M2 and the temperature adjusting unit 003 may be coupled to the control unit M1, the control unit M1 is coupled to each of the first sub-electrodes 11 and the second sub-electrode 12 of the microfluidic chip, and provides a driving voltage to the first sub-electrodes 11 and the second sub-electrode 12. The control unit M1 may also generate a temperature adjusting signal by comparing the temperature measured in real time by the temperature measuring unit M2 with a preset temperature value. The temperature adjusting unit 003 may adjust the temperature of the droplet 001 to realize real-time control of the temperature of the droplet 001.

In some embodiments, the temperature adjusting unit 003 can include various types of structures, such as a resistance wire, a thermoelectric temperature adjusting pad (e.g., peltier thermoelectric semiconductor device), and the like. An example in which the temperature adjusting unit 003 is a thermoelectric temperature adjusting sheet will be described below, and the temperature adjusting unit 003 may be disposed on a side of the first substrate 2 of the microfluidic unit coupled to the temperature measuring unit M2 facing away from the first sub-electrode 11.

Figure 21:
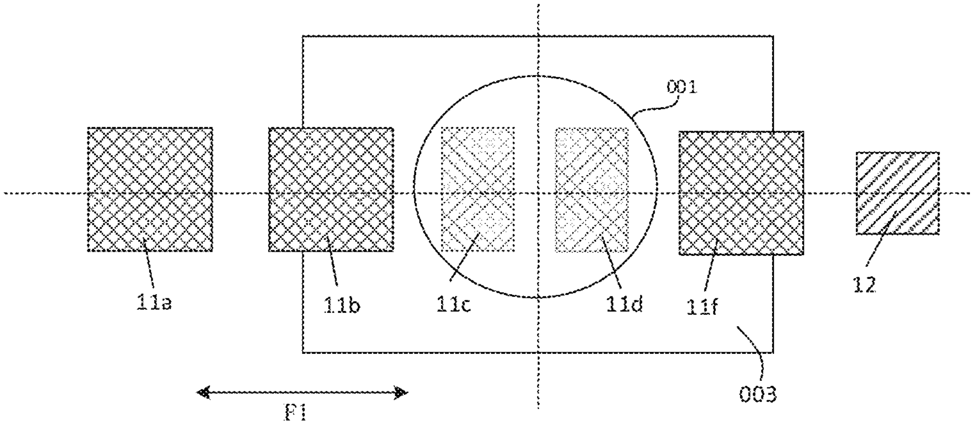
FIG. 21 is a first schematic layout diagram of respective electrodes of the microfluidic chip according to an embodiment of the present disclosure.

In some embodiments, referring to FIG. 21, in order to adjust the temperature of the droplet 001, the orthographic projection of the thermoelectric temperature adjusting sheet as the temperature adjusting unit 003 on the first substrate 2 covers at least the orthographic projection of each first sub-electrode 11 of the microfluidic unit coupled to the temperature measuring unit M2 on the first substrate 2. For example, in FIG. 21, the first sub-electrode 11*c* and the first sub-electrode 11*d* are coupled to the temperature measuring unit M2, when the droplet 001 flows through the first sub-electrode 11 coupled to the temperature measuring unit M2, the temperature measuring unit M2 detects the temperature of the droplet 001 in real time, the control unit M1 outputs a temperature adjusting signal to the temperature adjusting unit 003 according to the detected temperature, and the temperature adjusting unit 003 (e.g., a thermoelectric temperature adjusting sheet) performs heating or cooling according to the temperature adjusting signal to adjust the temperature of the droplet 001 in real time. The larger the area covered by the temperature adjusting unit 003, the more uniform the temperature of the heated region, but since an excessively large area may affect the temperature of the non-heated region, the area can be appropriately set as necessary, and is not limited herein.

In some embodiments, referring to FIG. 21, the thermoelectric temperature adjusting sheet as the temperature adjusting unit 003 may be a center-symmetric pattern (e.g., a rectangle, etc.), and a symmetric center (e.g., an intersection of two dotted lines in FIG. 21) of an orthographic projection of the temperature adjusting unit 003 on the first substrate 2 is located at a center (i.e., a midpoint between the two first sub-electrodes 11 under the droplet 001) of the droplet 001 to be measured, thereby ensuring the temperature uniformity of the heated region.

Figure 22:
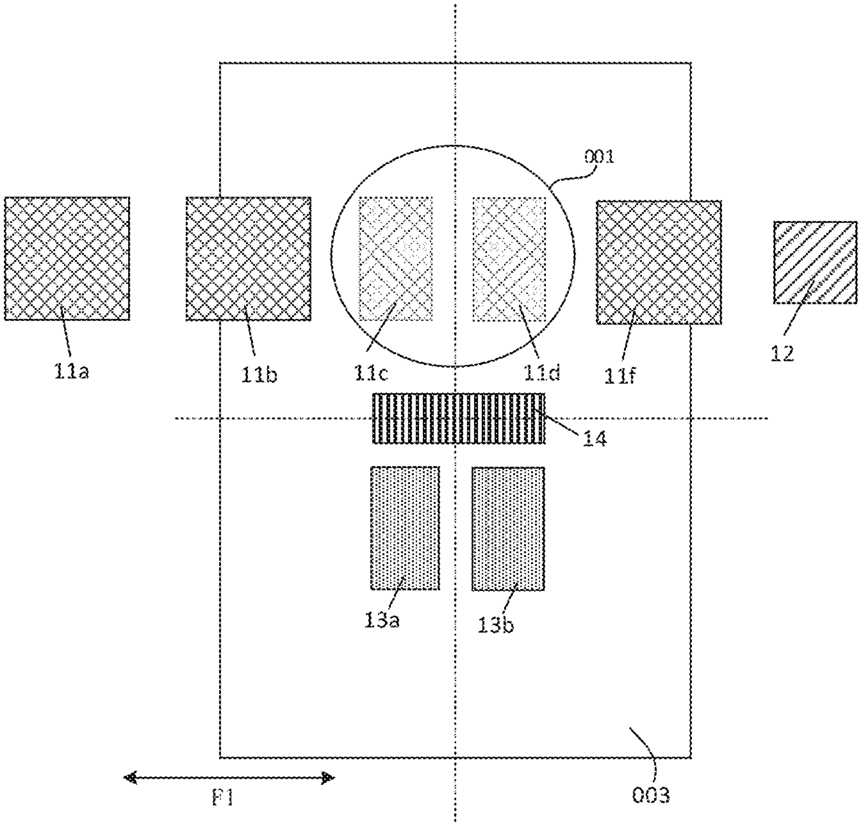
FIG. 22 is a second layout schematic diagram of respective electrodes of the microfluidic chip according to an embodiment of the present disclosure.

Referring to FIG. 22, similar to the circuit of the temperature measuring unit M2 described above, in the microfluidic chip provided in the embodiment of the present disclosure, the electrodes may be separately provided to form the feedback capacitor C', i.e., the microfluidic unit coupled to the temperature measuring unit M2 may further include two feedback electrodes (e.g., the first feedback electrode 13*a* and the second feedback electrode 13*b* in FIG. 22). The first feedback electrode 13*a* and the second feedback electrode 13*b* are disposed on the first substrate 2 of the microfluidic unit, and are disposed in the same layer as the first sub-electrode 11, i.e., the first feedback electrode 13*a* and the second feedback electrode 13*b* are disposed in the first electrode layer 1. The plurality of first sub-electrodes (for example, the first sub-electrodes 11*a* to 11*d* and 11*f* in FIG. 22) are arranged in the first direction F1, the first sub-electrode 11*c* and the first sub-electrode 11*d* are coupled to the temperature measuring unit M2, and the first feedback electrode 13*a* and the second feedback electrode 13*b* are disposed on either of two opposite sides in the arrangement direction (i.e., the first direction F1) of the first sub-electrodes. For example, in FIG. 22, the first feedback electrode 13*a* and the second feedback electrode 13*b* are disposed on a lower side in the arrangement direction of the first sub-electrodes. In this case, the first and second feedback electrodes 13*a* and 13*b* serve as lower plates of the feedback capacitor C', and the reference electrode 6 covers the first and second feedback electrodes 13*a* and 13*b* and serves as an upper plate of the feedback capacitor C' to form the feedback capacitor C'. As shown in FIG. 16, one of the first feedback electrode 13*a* and the second feedback electrode 13*b* is coupled to the first input port (−) of the operational amplifier M21 of the temperature measuring unit M2, the other of the first feedback electrode 13*a* and the second feedback electrode 13*b* is coupled to the output port of the operational amplifier M21, and the first feedback electrode 13*a* and the second feedback electrode 13*b* are not coupled to the control unit M1, which can reduce the wiring at the first sub-electrode.

In addition, referring to FIG. 22, in order to ensure the accuracy of detection, in the microfluidic chip provided in the embodiment of the present disclosure, the microfluidic unit coupled to the thermometric cell M2 may further include a dummy electrode 14 in addition to the first feedback electrode 13*a* and the second feedback electrode 13*b*. The dummy electrode 14 is disposed between the feedback electrodes (i.e., the first and second feedback electrodes 13*a* and 13*b*) and the first sub-electrodes (e.g., the first sub-electrodes 11*c* and 11*d*), thereby isolating signals between the feedback electrodes and the first sub-electrodes and preventing the occurrence of signal crosstalk due to the fact that the droplet 001 simultaneously covers the feedback electrodes forming the feedback capacitor C' and the first sub-electrodes forming the detection capacitor C(T).

In some embodiments, referring to FIG. 22, in order to ensure the accuracy of detection, the thermoelectric temperature adjusting sheet as the temperature adjusting unit 003 may be a centrosymmetric pattern (e.g., a rectangle, etc.), and the orthographic projection of the dummy electrode 14 on the first substrate 2 is located at the symmetric center (e.g., the intersection of two dotted lines in FIG. 22) of the orthographic projection of the temperature adjusting unit 003 on the first substrate 2. The dummy electrode 14 may extend along the arrangement direction F1 of the first sub-electrode 11, and the first feedback electrode 13*a* and the second feedback electrode 13*b* and the first sub-electrode 11 are symmetrically disposed with respect to the length direction of the dummy electrode 41. The first sub-electrode 11 and the first and second feedback electrodes 13*a* and 13*b* are disposed in the thermoelectric temperature adjusting sheet, and thus the first and second feedback electrodes 13*a* and 13*b* and the first sub-electrodes 11*c* and 11*d* have the same temperature environment, so that the accuracy of detection can be secured.

The microfluidic chip provided in the disclosure has a plurality of microfluidic units, each microfluidic unit has one operation region, and the microfluidic units can be freely combined to form the microfluidic chip, so that the microfluidic chip can adapt to various biological detection and can be locally repaired or replaced, thereby avoiding waste. Furthermore, a second sub-electrode is provided at the transition region of adjacent microfluidic units, which is capable of driving a droplet to move from one microfluidic unit to another microfluidic unit adjacent thereto.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the disclosure, and these changes and modifications are to be considered within the scope of the disclosure.

What is claimed is:

1. A microfluidic chip comprising a plurality of microfluidic units, each of the plurality of microfluidic units comprising an operation region and a transition region at least one side of the operation region, the transition regions at adjacent sides of two adjacent microfluidic units of the plurality of microfluidic units being opposite to each other, each of the plurality of microfluidic units comprising:

a first substrate;

a first electrode layer on the first substrate, the first electrode layer including a plurality of first sub-electrodes in the operation region and at least one second sub-electrode in the transition region, and the at least one second sub-electrode being configured to drive a droplet to move from one of the plurality of microfluidic units to an adjacent microfluidic unit, wherein at least one microfluidic unit of the plurality of microfluidic chips further comprises a temperature measuring circuit coupled to at least two adjacent first sub-electrodes of the at least one microfluidic unit to detect a temperature of the droplet flowing through the two adjacent first sub-electrodes, wherein the temperature measuring circuit comprises an operational amplifier, a signal processing circuit and a feedback capacitor, and the operational amplifier has a first input port, a second input port and an output port, and the first input port is coupled to the two adjacent first sub-electrodes that are coupled to the temperature measuring circuit; the feedback capacitor is coupled between the first input port and the output port; and the signal processing circuit is coupled to the output port.

2. The microfluidic chip according to claim 1, wherein each of the plurality of microfluidic units further comprises:

a first dielectric layer on the first electrode layer, and wherein the first dielectric layer is made of a material having hydrophobicity.

3. The microfluidic chip according to claim 1, wherein each of the plurality of microfluidic units further comprises:

a first dielectric layer on the first electrode layer; and a first hydrophobic layer on the first dielectric layer, and wherein the first dielectric layer is made of a material having no hydrophobicity.

4. The microfluidic chip according to claim 1, wherein an area of an orthographic projection of the at least one second sub-electrode on the first substrate is smaller than an area of an orthographic projection of each of the plurality of first sub-electrodes on the first substrate.

5. The microfluidic chip according to claim 4, wherein a ratio of the area of the orthographic projection of the at least one second sub-electrode on the first substrate to the area of the orthographic projection of each of the plurality of first sub-electrodes on the first substrate is 1:9 to 1:2.

6. The microfluidic chip according to claim 1, wherein each of the plurality of microfluidic units further comprises:

a second substrate opposite to the first substrate; and a reference electrode on a side of the second substrate close to the first substrate, an orthographic projection of the reference electrode on the first substrate covering an orthographic projection of the plurality of first sub-electrodes on the first substrate and at least partially overlapping an orthographic projection of the at least one second sub-electrode on the first substrate.

7. The microfluidic chip according to claim 6, wherein the reference electrode comprises a plurality of sub-reference electrodes in one-to-one correspondence with the plurality of first sub-electrodes and the at least one second sub-electrode.

8. The microfluidic chip according to claim 6, wherein an orthographic projection of the second substrate on the first substrate partially overlaps the orthographic projection of the at least one second sub-electrode on the first substrate in the same microfluidic unit.

9. The microfluidic chip according to claim 8, wherein the orthographic projection of the second substrate on the first substrate overlaps half of the orthographic projection of the at least one second sub-electrode on the first substrate in the same microfluidic unit.

10. The microfluidic chip according to claim 6, wherein each of the plurality of microfluidic units further comprises a bonding layer between the first substrate and the second substrate and surrounding an edge region of each microfluidic unit, and the bonding layer has a first opening at the transition region, and the first openings of two adjacent micro-fluidic units are opposite to each other.

11. The microfluidic chip according to claim 1, further comprising a fixation assembly for fixing the plurality of microfluidic units to form the microfluidic chip.

12. The microfluidic chip according to claim 11, wherein the fixation assembly comprises an outer frame and a plurality of stoppers and a plurality of springs within the outer frame, the outer frame is configured to define the plurality of microfluidic units therein, and has a rectangular shape, one ends of the plurality of springs are connected to at least two inner sidewalls of the outer frame, and the other ends of the plurality of springs are connected to the plurality of stoppers, and the plurality of stoppers are in contact with some of the plurality of microfluidic units at an outer edge, respectively, others of the microfluidic units at the outer edge are in contact with other inner sidewalls of the outer frame other than the at least two inner sidewalls, and the plurality of springs are in a compressed state such that restoring forces of the plurality of springs are applied to the plurality of microfluidic units.

13. The microfluidic chip according to claim 1, further comprising a flat support layer, the plurality of microfluidic units being on the flat support layer.

14. The microfluidic chip according to claim 1, further comprising an adhesive structure on the first substrate in the transition regions of two adjacent microfluidic units to connect the two adjacent microfluidic units to each other.

15. The microfluidic chip according to claim 1, wherein the at least one microfluidic unit coupled to the temperature measuring circuit further comprises two feedback electrodes on the first substrate of the at least one microfluidic unit and on one side of the first electrode layer in a direction perpendicular to an arrangement direction of the plurality of first sub-electrodes so as to correspond to the two adjacent first sub-electrodes; the two feedback electrodes are two electrode plates of the feedback capacitor, and the two feedback electrodes are respectively coupled to the first input port and the output port.

16. The microfluidic chip according to claim 15, wherein the at least one microfluidic unit coupled to the temperature measuring circuit further comprises: a dummy electrode between the two feedback electrodes and the two adjacent first sub-electrodes and configured to isolate a signal between the two feedback electrodes and the two adjacent first sub-electrodes.

17. The microfluidic chip according to claim 1, wherein the at least one microfluidic unit further comprises a temperature adjusting circuit and a control circuit, the temperature measuring circuit and the temperature adjusting circuit are both connected to the control circuit; the control circuit is configured to control the temperature adjusting circuit to adjust the temperature of the droplet according to the temperature measured by the temperature measuring circuit.

18. The microfluidic chip according to claim 17, wherein the temperature adjusting circuit comprises a thermoelectric temperature adjusting sheet on a side of the first substrate of the at least one microfluidic unit coupled to the temperature measuring circuit facing away from the plurality of first sub-electrodes, and wherein an orthographic projection of the thermoelectric temperature adjusting sheet on the first substrate covers an orthographic projection of each of the plurality of first sub-electrodes of the at least one micro-fluidic unit coupled to the temperature measuring circuit on the first substrate.

* * * * *